(12) United States Patent
Novelli et al.

(10) Patent No.: US 11,163,995 B2
(45) Date of Patent: Nov. 2, 2021

(54) USER RECOGNITION AND GAZE TRACKING IN A VIDEO SYSTEM

(71) Applicant: Logitech Europe S.A., Lausanne (CH)

(72) Inventors: Ludovico Novelli, Geneva (CH); Arnaud Hennig, Lausanne (CH); Mathieu Salzmann, Yverdon-les-Bains (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/731,831

(22) Filed: Dec. 31, 2019

(65) Prior Publication Data
US 2021/0201021 A1 Jul. 1, 2021

(51) Int. Cl.
G06K 9/00 (2006.01)
G06T 11/00 (2006.01)
G06F 3/01 (2006.01)

(52) U.S. Cl.
CPC ......... G06K 9/00617 (2013.01); G06F 3/013 (2013.01); G06K 9/00248 (2013.01); G06T 11/001 (2013.01)

(58) Field of Classification Search
None
See application file for complete search history.

(56) References Cited

U.S. PATENT DOCUMENTS

| | | | |
|---|---|---|---|
| 6,095,989 A * | 8/2000 | Hay | A61B 3/0025 600/558 |
| 7,572,008 B2 | 8/2009 | Elvesjo et al. | |
| 8,120,577 B2 | 2/2012 | Bouvin et al. | |
| 8,493,390 B2 | 7/2013 | Kalinli | |
| 8,610,768 B2 | 12/2013 | Holmberg et al. | |
| 9,213,404 B2 | 12/2015 | John Elvesjo et al. | |
| 10,203,758 B2 | 2/2019 | Bjorklund et al. | |
| 10,346,985 B1 * | 7/2019 | Poliakov | G06K 9/38 |
| 10,460,466 B2 | 10/2019 | Oguro et al. | |
| 10,554,921 B1 | 2/2020 | Lim et al. | |
| 10,928,904 B1 | 2/2021 | Novelli | |

(Continued)

OTHER PUBLICATIONS

Wikipedia, "MS Kinect for Xbox 360" Retrieved on Jan. 8, 2020. Retrieved from Internet: <https://en.wikipedia.org/wiki/Kinect>, 25 pages.

(Continued)

Primary Examiner — Edward Martello
(74) Attorney, Agent, or Firm — Kilpatrick Townsend & Stockton LLP

(57) ABSTRACT

Some embodiments include a computer-implemented method for tracking a gaze of a user that can include receiving image data that includes a plurality of eye landmarks that identify a perimeter of a user's eye, applying dynamic thresholding to the image data, determining a convex hull based on the dynamically thresholded and image data, computing and fitting an ellipse along a boundary of the convex hull, the ellipse corresponding to an iris of the user's eye, updating the image data with the computed ellipse, computing a refined ellipse by reapplying the dynamic thresholding and determining the convex hull using the updated image data, and determining a gaze direction of the user based in part on a position of the refined ellipse relative to the perimeter of the user's eye.

20 Claims, 22 Drawing Sheets

(56) References Cited

U.S. PATENT DOCUMENTS

| | | | | |
|---|---|---|---|---|
| 2006/0204041 | A1* | 9/2006 | Hammoud | G06K 9/00597 382/107 |
| 2012/0146891 | A1 | 6/2012 | Kalinli | |
| 2014/0168056 | A1 | 6/2014 | Swaminathan et al. | |
| 2016/0132735 | A1* | 5/2016 | Derakhshani | G06K 9/00 382/117 |
| 2017/0091520 | A1* | 3/2017 | Ishii | G06K 9/00617 |
| 2017/0109897 | A1 | 4/2017 | Oguro et al. | |
| 2018/0300940 | A1 | 10/2018 | Sakthivel et al. | |
| 2020/0036939 | A1 | 1/2020 | Salou et al. | |
| 2020/0045261 | A1 | 2/2020 | Lim et al. | |
| 2020/0081527 | A1 | 3/2020 | Agaoglu et al. | |

OTHER PUBLICATIONS

Wikipedia, "MS Kinect for Windows" Retrieved on Jan. 8, 2020. Retrieved from Internet: <https://en.wikipedia.org/wiki/Kinect>, 25 pages.

Microsoft, "MS Azure Kinect DK" Retrieved on Jan. 8, 2020. Retrieved from Internet: <https://www.microsoft.com/en-us/p/azure-kinect-dk/8pp5vxmd9nhq?activetab=pivot%3aoverviewtab>, 5 pages.

Tobii, "Tobii Eye Tracker 4C" Retrieved on Jan. 8, 2020. Retrieved from Internet: <https://gaming.tobii.com/tobii-eye-tracker-4c/>, 7 pages.

Tobii, "Tobii Pro X3-120" Retrieved on Jan. 8, 2020. Retrieved from Internet: <https://www.tobiipro.com/product-listing/tobii-pro-x3-120/>, 11 pages.

Tobii, "Tobii Aware" Retrieved on Jan. 8, 2020. Retrieved from Internet: <https://help.tobii.com/hc/en-us/articles/213597409-Tobii-Aware-Features>, 6 pages.

Tadas Baltrusaitis et al., "OpenFace 2.0: Facial Behavior Analysis Toolkit" 2018 13th IEEE International Conference on Automatic Face Gesture Recognition (FG 2018), pp. 59-66, 2018, 8 pages.

Lech Swirski et al., "Robust real-time pupil tracking in highly off-axis images" Eye Tracking Research and Applications Symposium (ETRA), pp. 173-176, Mar. 2012, 4 pages.

Kevin W. Bowyer et al., "Cosmetic contact lenses and iris recognition spoofing" Computer—Published by the IEEE Computer Society, vol. 47: pp. 96-98, 2014, 3 Pages.

Erroll Wood et al., "Learning an appearance-based gaze estimator from one million synthesised images" ETRA '16—Published Mar. 14-17, 2016 Charleston, SC, USA, 8 pages.

Chao Gou et al., "A joint cascaded framework for simultaneous eye detection and eye state estimation." *Pattern Recognition*, vol. 67, pp. 23-31, Published by Elsevier Ltd., Jul. 2017, 9 pages.

Bin Li et al., "Real time eye detector with cascaded convolutional neural networks" *Applied Computational Intelligence and Soft Computing*, vol. 2018, pp. 1-8, Published by Hindawi, Apr. 2018, 9 pages.

Seonwook Park et al., "Learning to find eye region landmarks for remote gaze estimation in unconstrained settings." In *ACM Symposium on Eye Tracking Research and Applications* (*ETRA*), ETRA '18 Published by Association for Computing Machinery, New York, NY, USA, Jun. 14-17, 2018, 10 pages.

Chao Gou et al., "Cascade learning from adversarial synthetic images for accurate pupil detection." *Pattern Recognition*, vol. 88, pp. 584-594, Published by Elsevier Ltd., Apr. 2019, 11 pages.

Fabian Timm et al., "Accurate eye centre localisation by means of gradients." pp. 125-130, Jan. 2011, 6 pages.

Anjith George et al., "A fast and accurate algorithm for eye localization for gaze tracking in low resolution images." *IET Computer Vision*, Published by IET Digital Library, vol. 10, Mar. 2016, 12 pages.

Tibor Moraveik, "An approach to iris and pupil detection in eye image" XII International PhD Workshop, OWD 2010, Oct. 23-26, 2010, 4 pages.

Amir-Homayoun Javadi et al., "Set: a pupil detection method using sinusoidal approximation." *Frontiers in Neuroengineering*, vol. 8, Article 4, Published Apr. 9, 2015, 10 pages.

Hugo Proena et al, "Introduction to the special issue on the segmentation of visible wavelength iris images captured at-a-distance and on-the-move." *Image Vision Comput.*, vol. 28, pp. 213-214, 2010, 2 pages.

Andrew W. Fitzgibbon et al., "A buyer's guide to conic fitting." In *BMVC*, 1995, 10 pages.

Pedro De Almeida, "A knowledge-based approach to the iris segmentation problem". *Image and Vision Computing*, 28(2):238-245, 2010. Segmentation of Visible Wavelength Iris Images Captured At-a-distance and On-the-move.

P. Jonathon Phillips et al., "The feret database and evaluation procedure for face-recognition algorithms." *Image Vision Computing, Published by Elseview*, vol. 16, pp. 295-306, 1998, 12 pages.

Michael J. Lyons et al., "Coding facial expressions with gabor wavelets." *Proceedings Third IEEE International Conference on Automatic Face and Gesture Recognition*, pp. 200-205, Apr. 14-16, 1998, 6 pages.

Gary B. Huang et al. "Labeled faces in the wild: A database for studying face recognition in unconstrained environments." Technical Report 07-49, University of Massachusetts, Amherst, Oct. 2007, 11 pages.

Victoria Ponz et al., Dataset for the evaluation of eye detector for gaze estimation. In *UbiComp*, PETMEI, Pittsburg, PA, Sep. 8, 2012, 23 pages.

Oliver Jesorsky et al., "Robust face detection using the hausdorff distance". Third International Conference on Audio-and Video-based Biometric Person Authentication, Springer, Lecture Notes in Computer Science, LNCS-2091, pp. 90-95, Halmstad, Sweden, Jun. 6-8, 2001, 6 pages.

FACE++ Cognitive Services. Retrieved on Jan. 10, 2020. Retrieved from Internet: <https://www.faceplusplus.com/dense-facial-landmarks/.>, 3 pages.

Visage Technologies AB. Retrieved on Jan. 10, 2020. Retrieved from Internet: <http://visagetechnologies.com/.>, 7 pages.

Tieniu Tan et al, "Efficient and robust segmentation of noisy iris images for non-cooperative iris recognition." *Image and Vision Computing*, 28(2):223-230, 2010. Segmentation of Visible Wavelength Iris Images Captured At-a-distance and On-the-move.

Xucong Zhang et al. "Appearance-based gaze estimation in the wild." In *Proc. of the IEEE Conference on Computer Vision and Pattern Recognition* (*CVPR*), Jun. 2015, 10 pages.

U.S. Appl. No. 16/731,830, "Corrected Notice of Allowance", dated Oct. 6, 2020, 4 pages.

U.S. Appl. No. 16/731,830, "Notice of Allowance", dated Oct. 2, 2020, 10 pages.

* cited by examiner

USER RECOGNITION AND GAZE TRACKING IN A VIDEO SYSTEM

CROSS-REFERENCES TO RELATED APPLICATIONS

U.S. patent application Ser. No. 16/569,315, filed Sep. 12, 2019, and entitled "Eye Fatigue Detection Using Visual Imaging" is incorporated by reference in its entirety into the present application for all purposes.

BACKGROUND

The advent of web cameras has enhanced telecommunications in a number of positive ways. As data communication rates increase, web camera functionality has enabled real-time video collaboration between multiple parties, which has enhanced the quality of human interaction, particularly in business settings. Video collaboration promotes more personable interactions by allowing people to see and hear each other and detect more subtle visual cues (e.g., facial expressions, body postures, etc.) that are often lost in audio based communication.

Some contemporary systems can provide further enhancements including facial recognition systems, which may be used to identify who is present in a meeting, who is presently speaking, and the like. Some systems can use this information to improve audio by audio beamforming a microphone array to improve audio fidelity for a current speaker. In some systems, the speaker may be highlighted in some manner that indicates to the participants who is currently speaking. Despite the many positive developments for multi-party communications using camera devices, many systems are still fraught with inaccurate and inconsistent performance characteristics. Further developments in this field are needed.

BRIEF SUMMARY

In some embodiments, a computer-implemented method for tracking a gaze of a user may include: receiving image data (e.g., red channel image data) that includes a plurality of eye landmarks that identify a perimeter of a user's eye; identifying corners of the user's eye based on locations of the eye landmarks; removing the corners of the user's eye from the image data to generate edited image data; applying dynamic thresholding to the edited image data including: determining a lowest pixel intensity value of the edited image data; determining a highest pixel intensity value of the edited image data; selecting a threshold value for the edited image data that is between the lowest and highest pixel intensity values; reassigning pixel values below the threshold value to a minimum intensity value; and reassigning pixel values at or above the threshold value to a maximum intensity value; determining a convex hull based on the dynamically thresholded and edited image data; computing and fitting an ellipse along a boundary of the convex hull, the ellipse corresponding to an iris of the user's eye; updating the edited image data with the computed ellipse; computing a refined ellipse by reapplying the dynamic thresholding and determining the convex hull using the updated edited image data; and determining a gaze direction of the user based in part on a position of the refined ellipse relative to the perimeter of the user's eye.

In some embodiments, the method can further include applying morphological operators to the determined convex hull that remove image noise both inside and outside of the determined convex hull, where the computing and fitting the ellipse to the convex hull is applied after the morphological operators are applied. In some implementations, the minimum pixel intensity value is 0 corresponding to black, and the maximum pixel intensity value is 255 corresponding to white. In certain aspects, the ellipse and refined ellipse can be fitted along the boundary of the convex hull based on a least-squares approximation. Removing the corners of the user's eye may result in a diamond-shaped image of the user's eye with a left and right side of the image of the user's eye coming to a point due to the removed corners. In some cases, the method can include comparing a width of the ellipse with a width of the perimeter of the eye; comparing a height of the ellipse with a height of the perimeter of the eye; and recomputing the ellipse when the comparison of the widths or the comparison of the heights are outside of a set of predetermined bounded ratios between the size of the ellipse with the size of the user's eye. In some embodiments, selecting the threshold value includes adding the lowest and highest pixel intensity values and dividing by a predetermined value, and recomputing the ellipse includes reapplying dynamic thresholding to the edited image data with a different predetermined value. The method can further include: determining a location of the user's pupil based on the fitted ellipse, where determining the gaze direction of the user is based primarily on the determined location of the user's pupil relative to the perimeter of the user's eye, according to certain embodiments.

In some embodiments, a system for tracking a gaze of a user comprises: one or more processors and one or more machine-readable non-transitory storage mediums that includes instructions configured to cause one or more processors to perform operations including: receiving image data that includes a plurality of eye landmarks that identify a perimeter of a user's eye; applying dynamic thresholding to the image data including: determining a lowest pixel intensity value of the image data; determining a highest pixel intensity value of the image data; selecting a threshold value for the image data that is between the lowest and highest pixel intensity values; reassigning pixel values below the threshold value to a minimum intensity value; and reassigning pixel values at or above the threshold value to a maximum intensity value; determining a convex hull based on the dynamically thresholded and image data; computing and fitting an ellipse along a boundary of the convex hull, the ellipse corresponding to an iris of the user's eye; updating the image data with the computed ellipse; computing a refined ellipse by reapplying the dynamic thresholding and determining the convex hull using the updated image data; and determining a gaze direction of the user based in part on a position of the refined ellipse relative to the perimeter of the user's eye.

In further embodiments of the system, the instructions are further configured to cause the one or more processors to perform operations including: identifying corners of the user's eye based on locations of the eye landmarks; and removing the corners of the user's eye from the image data to generate edited image data. In some cases, the instructions are further configured to cause the one or more processors to perform operations including: applying morphological operators to the determined convex hull that remove image noise both inside and outside of the determined convex hull, where the computing and fitting the ellipse to the convex hull is applied after the morphological operators are applied. In some cases, the image data can be red channel image data, and the pixel intensity values can be grayscale values. In some aspects, the minimum pixel intensity value is 0 corresponding to black, and the maximum pixel intensity value is 255 corresponding to white. The ellipse and refined ellipse may be fitted along the boundary of the convex hull based on a least-squares approximation. In some cases, removing the corners of the user's eye results in a diamond-shaped image of the user's eye with a left and right side of the image of the user's eye coming to a point due to the removed corners.

Further embodiments may include a non-transitory computer-program product tangibly embodied in a machine-readable non-transitory storage medium that includes instructions configured to cause one or more processors to perform operations including: receiving image data that includes a plurality of eye landmarks that identify a perimeter of a user's eye; applying dynamic thresholding to the image data including: determining a lowest pixel intensity value of the image data; determining a highest pixel intensity value of the image data; selecting a threshold value for the image data that is between the lowest and highest pixel intensity values; reassigning pixel values below the threshold value to a minimum intensity value; and reassigning pixel values at or above the threshold value to a maximum intensity value; determining a convex hull based on the dynamically thresholded and image data; computing and fitting an ellipse along a boundary of the convex hull, the ellipse corresponding to an iris of the user's eye; updating the image data with the computed ellipse; computing a refined ellipse by reapplying the dynamic thresholding and determining the convex hull using the updated image data; and determining a gaze direction of the user based in part on a position of the refined ellipse relative to the perimeter of the user's eye.

In certain embodiments, the instructions of the computer-program product can be further configured to cause the one or more processors to perform operations including: identifying corners of the user's eye based on locations of the eye landmarks; and removing the corners of the user's eye from the image data to generate edited image data. In some cases, the instructions are further configured to cause the one or more processors to perform operations including: applying morphological operators to the determined convex hull that remove image noise both inside and outside of the determined convex hull, wherein the computing and fitting the ellipse to the convex hull is applied after the morphological operators are applied. In some aspects, the image data can be red channel image data, and the pixel intensity values can be grayscale values.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
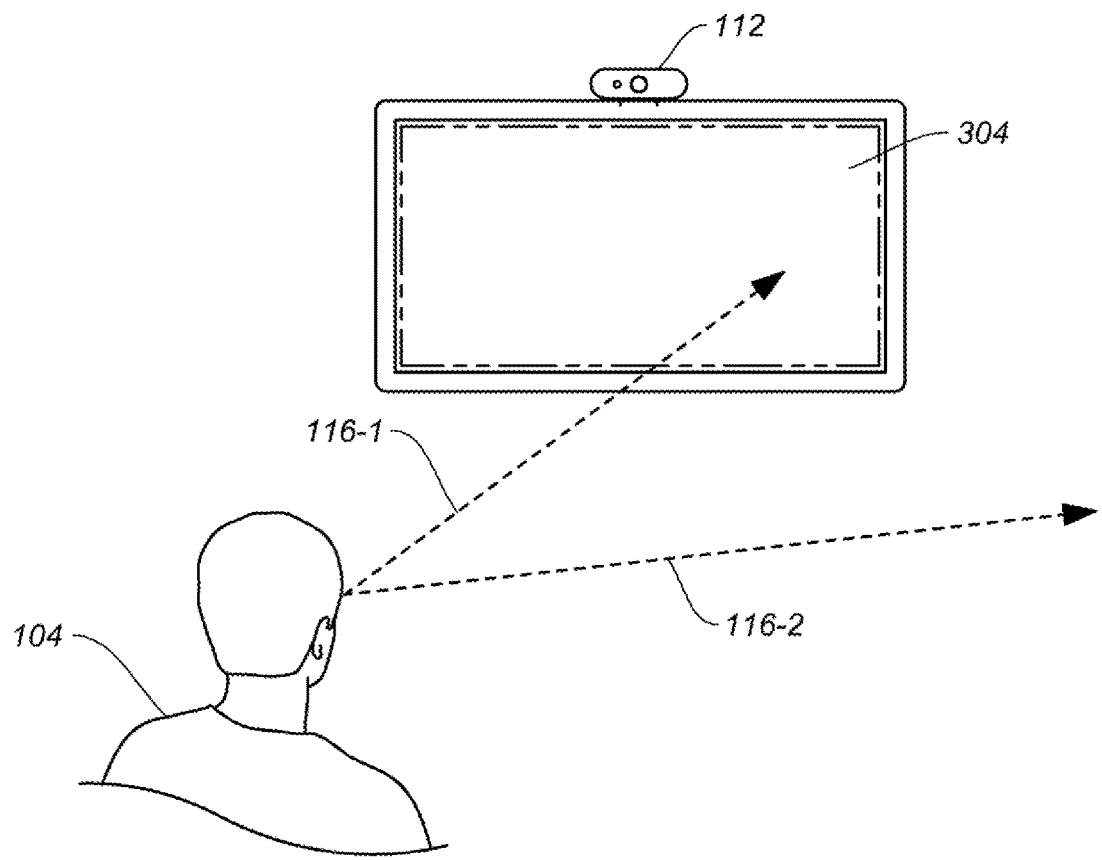
FIG. 1 shows a simplified diagram of a system for eye tracking to determine gaze direction of a user toward a display, according to certain embodiments.

Aspects of the present disclosure relate generally to video camera systems, and more particularly to gaze tracking and pupil detection in a video system, according to certain embodiments.

In the following description, various examples of gaze tracking and pupil detection are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to user recognition and gaze tracking in a video system, according to certain embodiments. A video system may track a gaze of a user to determine where the user is looking on a screen, and in some aspects, may select certain icons or execute certain processes (e.g., applications) based on the user's gaze. In order to track the user's gaze, the system can identify a location of the user's eyes (e.g., using one or more image sensors) by utilizing landmarks on a user's face. Eye regions can be extracted from images based on landmarks of the face to identify the user's iris(es), and certain processes can be used to determine a center of the corresponding pupils of the eye regions, which can be used to deduce a location of where the user is looking (also referred to as gaze tracking), as further described below at least with respect to FIGS. 1-4 and 11-32.

An additional challenge with gaze tracking can include determining what the user intends to select and/or interact with on a display. For example, the system may track the user's gaze, which may include visually scanning one or more displays (e.g., flat displays, augmented reality or virtual reality three-dimensional environments, etc.) to observe content provided therein. Determining when a user intends to select or interact with an icon, media, or other object that the user's gaze is fixated on can be difficult to predict. To provide more certainty, some embodiments may allow a user to provide a confirmation input (e.g., a button press, voice command, etc.) via a physical input device (e.g., remote control, presenter device, computer mouse, keyboard, etc.) causing the system to generate and effectuate an input command based on the location on the display that the user is directing their gaze when the confirmation input is received, as described below at least with respect to FIG. 5-9. In other words, the user can indicate when they intend the perform an interaction (e.g., select an icon or object, execute an application, etc.) with a particular location, object, area, etc., on the display that their gaze is directed to. The term "screen" and "display" are used interchangeably throughout this description and both refer to a viewable portion of a device (e.g., monitor, smart phone, etc.) that can display images (e.g., graphics).

In some cases, one or more bystanders may be in the field-of-view of the one or more images sensors which can further complicate matters as it may be unclear which gaze of each person in the field-of-view should be used to interact with the system. The input device may be tracked and associated with the user that is holding and operating it. In scenarios where the input device may not in the field-of-view of the system, some implementations may additionally or alternatively incorporate other data that can be used to increase a confidence score that can reflect the likelihood that a tracked user is, in fact, the intended user and not an unintended bystander. For example, beyond eye tracking, face tracking and/or body tracking (e.g., associated with user credentials and/or physical data) can be performed to both identify a user based on their facial features and a previous location of their face/head, as further described below with respect to FIG. 6. In some aspects, the user may be determined based on a distance from the image sensor(s) (e.g., the closer detected person may be more likely to be the user), the direction a detected person's head is facing (e.g., a person facing the display may be more likely to be the user than a person looking elsewhere), or the like, as further described below with respect to FIG. 7. In such cases, when the system can differentiate a user from bystanders with an acceptable confidence level, inputs from bystanders (e.g., bystander gaze detection) can be ignored when performing the various gaze tracking and input command generation actions described above (and throughout this disclosure). This can be useful, particularly in public areas such as in with public kiosks or more sensitive business or governmental settings. These innovations and more are discussed in greater detail in the embodiments and description that follow.

Gaze Tracking

FIG. 1 shows a simplified diagram of a system 100 for eye tracking to determine gaze direction of a user 104 toward a monitor 108, according to certain embodiments. System 100 comprises a camera 112 and optionally a light sensor 114 (e.g., used to detect ambient light). The camera may include a lens and one or more image sensors. The image sensor(s) can be configured to detect visible light. For example, the image sensor can be configured to detect red, blue, and/or green light to form an image.

Camera 112 can be configured to acquire a plurality of images of an eye of the user 104. The images can be visible light images (i.e., images that include image information in a visible light spectrum of wavelengths from about 380 to 740 nanometers). System 100 may comprise one or more processors configured to analyze the plurality of images. System 100 can determine a gaze direction 116 of the user 104 based on analyzing the plurality of images. For example, pupil location in the plurality of images can be tracked. Pupil position relative to the camera can be based on a location of an image of the eye (e.g., image of the iris to determine pupil location) by an image sensor of the camera. Based on pupil location in the plurality of images, gaze direction 116 can be calculated. Features of a head of the user 104 can also be tracked. For example, a nose, a forehead, and/or an ear of the user 104 can be tracked to determine rotation of the head of user 104. Rotation of the head of the user can also be used to determine gaze direction 116 of user 104.

System 100 can determine an X amount of time gaze direction 116 of user 104 is directed to a specified region 120 in a Y window of time. The specified region is a display of an electronic device. In FIG. 1, specified region 120 is a screen of the monitor 108. FIG. 1 shows a first gaze direction 116-1 and a second gaze direction 116-2. The first gaze direction 116-1 is directed toward the specified region 120. The second gaze direction 116-2 is directed to outside the specified region 120.

System 100 can track, using the plurality of images detected by camera 112 a location of the pupil of user 104 in relation to camera 112, wherein the plurality of images are acquired over a time period. For example, the time period is the Y window of time.

System 100 can determine the gaze direction 116 of the user 104 of the time period, wherein gaze direction 116 can be based on the tracked location of the pupil.

System 100 can calculate a length of time during the time period that the gaze direction 116 of user 104 is directed to specified region 120. For example, the length of time can be the X amount of time in the Y window of time. System 100 can determine that the length of time that the gaze direction 116 of user 104 is directed to specified region 120 exceeds a threshold value within the time period. For example, the time period can be 30 minutes and the threshold value can be 25 minutes. In this example, if user 104 looks at a screen longer than 25 minutes in a 30 minute window, then the threshold value can be exceeded. In some embodiments, the threshold value is a first threshold value and a second threshold value is used. The second threshold value can be a minimum amount of time that the gaze direction 116 is outside of the specified region. For example, the second threshold value can be 20 seconds; once the second threshold value has been met (i.e., user 104 has a gaze direction 116 for more than 20 seconds outside the specified region 120), then the time period can be reset to zero.

Determining the gaze direction 116 can be binary, e.g., gaze direction 116 can be determined to be directed toward the specified region 120 or not. For example, if the head of user 104 is rotated away from the camera 112 and the pupil of user 104 cannot be detected, system 100 can determine that user 104 is not looking at the specified region, even though the system cannot actively track the pupil of user 104.

Figure 2:
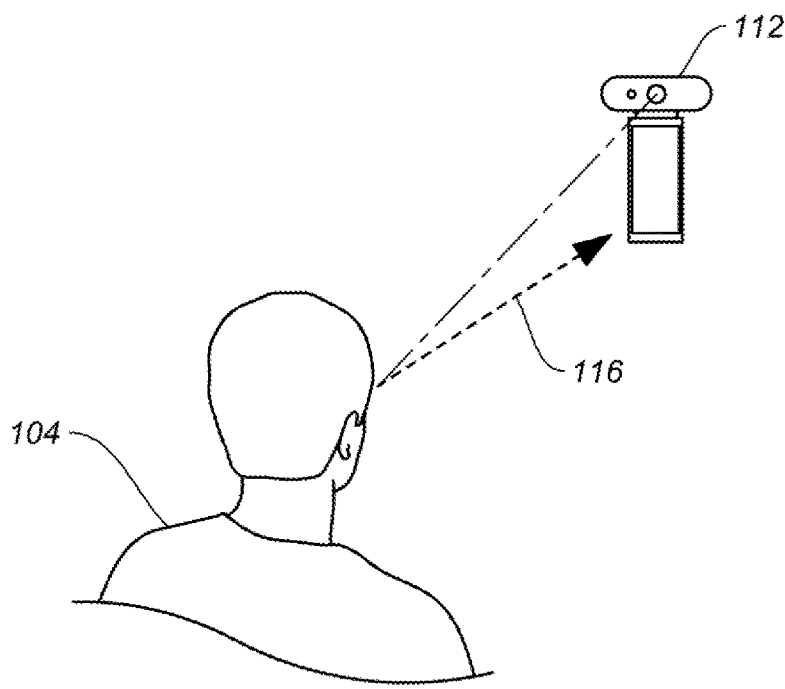
FIG. 2 shows a simplified diagram of a system for eye tracking to determine gaze direction of a user toward a mobile device, according to certain embodiments.

FIG. 2 shows a simplified diagram of system 100 for eye tracking to determine a gaze direction of a user toward a mobile device 200, according to certain embodiments. The specified region 120 in FIG. 2 can be a screen of the mobile device. The gaze direction 116 of user 104 is to the screen of mobile device 200. Viewing distance from a screen can be about 1.5 times a width of the screen (e.g., measured diagonally). Viewing distance can also be a function of screen brightness.

The system 100 can determine, as disclosed herein, how far user 104 is from the specified region 120 based on calculating a distance d from the camera 112 to the pupil of the user 104 and the relation of the camera 112 with the specified region 120.

In some embodiments, camera 112, light sensor 114, memory device, and/or processors are part of mobile device 200, and when a mobile device app is loaded on mobile device 200, then mobile device 200 becomes system 100.

Figure 3:
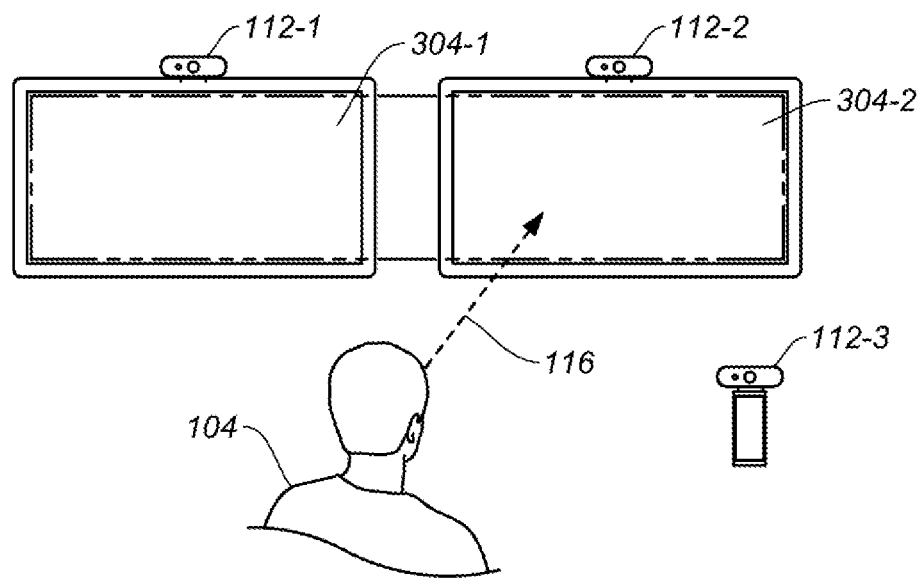
FIG. 3 shows a simplified diagram of a combined system for eye tracking to determine gaze direction of a user toward multiple displays, according to certain embodiments.

FIG. 3 shows a simplified diagram of an embodiment of a combined system 300 for eye tracking to determine gaze direction 116 of a user 104 toward multiple displays, according to certain embodiments. The combined system 300 comprises a first system 100-1, a second system 100-2, a third system 100-3, a first screen 304-1, a second screen 304-2, and a third screen 304-3. The first screen 304-1 is part of a first monitor 108-1. The second screen 304-2 is part of a second monitor 108-2. The third screen 304-3 is part of a mobile device 200. The first system 100-1 is attached to the first monitor 108-1. The second system 100-2 is attached to the second monitor 108-2. The third system 100-3 is attached to the mobile device 200. A first specified region 120-1 is a combination of the first screen 304-1, the second screen 304-2, and area between the first screen 304-1 and the second screen 304-2. The area between the first screen 304-1 and the second screen 304-2 can be part of the first specified region 120-1 because an eye of the user 104 usually does not change focus when changing gaze direction 116 from the first screen 304-1 to the second screen 304-2. A second specified region 120-2 includes the third screen 304-3. The combined system 300 does not include user 104 or the gaze direction 116. In some embodiments, the combined system is the first system 100-1, the second system 100-2, and the third system 100-3.

User 104 can have more than one display to look at. The combined system 300 tracks the gaze direction 116 of user 104 to specified region 120, which includes both first specified region 120-1 and second specified region 120-2. In some embodiments, the combined system 300 uses a software application (e.g., on a remote server, on a personal computer, on a mobile device, on a system 100) to coordinate eye tracking among multiple systems 100. Wired (e.g., Ethernet) and/or wireless connections (e.g., Wi-Fi, Bluetooth) are used to share data regarding gaze direction 116 of user 104. The software application can retrieve display settings of devices to determine specified region 120.

User 104 can set up a user profile and/or an account. Eye tracking of user 104 can be tailored to the user 104 (e.g., the system 100 and/or the combined system 300 can be trained per user 104). For example, different users may have different interpapillary distances, sizes of pupils, eye color, facial features, eyelid closure, etc. In some embodiments, an administration account is set up to monitor and/or control eye-fatigue mitigation and other controls.

Using the combined system 300, eye fatigue of user 104 can be better monitored. For example, user 104 could be viewing monitors 108 and then send a text using mobile device 200. The combined system 300 could track the time user 104 views monitors 108 and the time the user views third screen 304-3 of the mobile device 200 to send the text as time toward triggering the eye fatigue mitigation action.

Many variations are possible. For example, instead of using a camera of third system 100-3 that is separate from mobile device 200, the third system 100-3 could use a camera of mobile device 200, as mentioned in the description of FIG. 2. The combined system could use first system 100-1 for both first monitor 108-1 and second monitor 108-2 and not use the second system 100-2.

Figure 4:
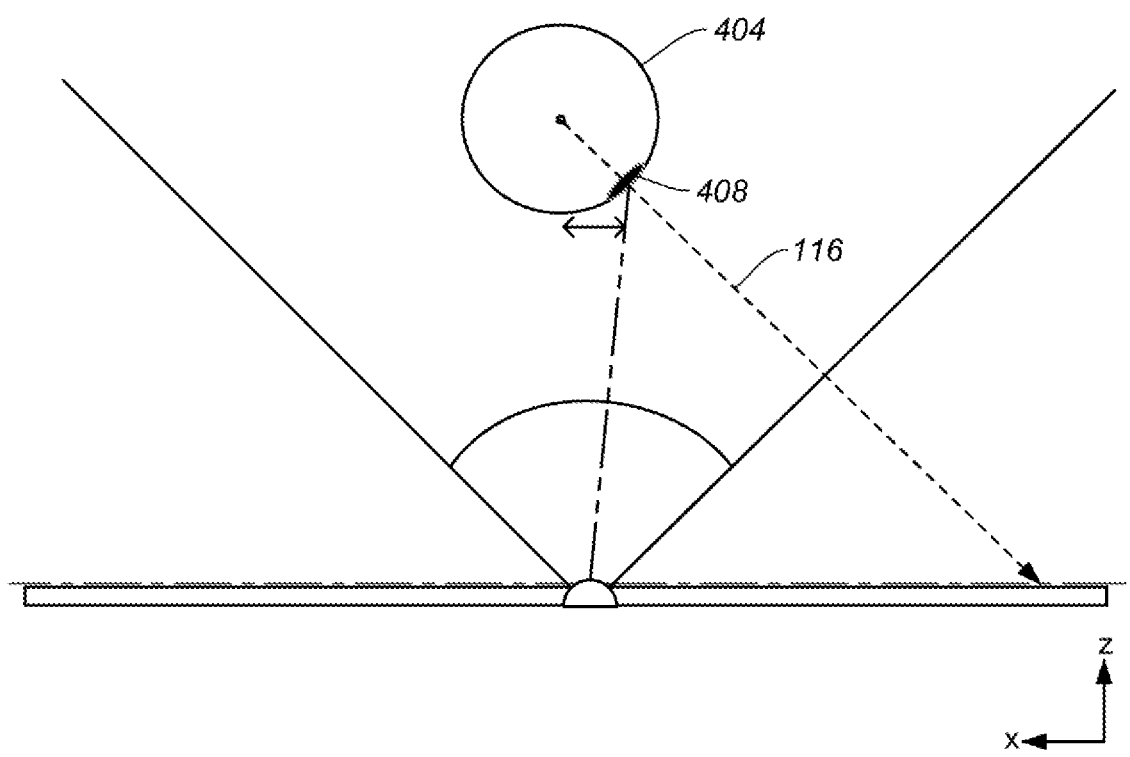
FIG. 4 is a simplified diagram of a system for determining gaze direction to a specified region, according to certain embodiments.

FIG. 4 is a simplified diagram of an embodiment for determining gaze direction 116 to a specified region 120, according to certain embodiments. FIG. 4 shows an eyeball 404 of the user 104, a camera 112, and a screen 304. The eyeball 404 has a pupil 408 defined by an iris of the eye.

Camera 112 can comprise a lens and a sensor. The lens and the sensor can define a field of view 412 of camera 112. The sensor can be sensitive to visible light. For example, the sensor can be a CMOS sensor having diodes sensitive to red, green, and blue light. The camera 112 can be used to identify and/or track features of eyeball 404 and/or areas around the eyes, such as eyelids, eyebrows, nose, hair, etc.

A surface of screen 304 can define an x-y plane, with a corresponding positive z dimension defined as being toward user 104. The camera 112 can be placed to image user 104 (e.g., an optical axis of the camera 112 can be pointed in the z direction). The sensor can be defined by a plane. The plane of the senor is parallel to the plane of screen 304 (e.g., +/−0, 3, 5, 10, or 20 degrees about the y axis and/or the x axis). In some embodiments, camera 112 can be positioned to be no farther than 2, 5, 10, 15, or 20 centimeters from the specified region 120. Specified region 120 can be an area in an x-y plane parallel on the x-y plane defined by the screen 304.

A distance d from camera 112 to pupil 408 can be calculated. For example, if a focal length of the lens of camera 112 is known and a dimension of user 104 is known (e.g., interpupilary distance of eyes of user 104), then the distance d can be calculated (or estimated based on averages, such as the average interpupilary distance of a given population). In some embodiments, focal length of the eyes of the user is determined by detecting convergence of gaze direction of both eyes of the user. If convergence is closer to the user than screen 304 is to the user, then focal length of the user is closer to the user than screen 304. If convergence is farther from the user than screen 304 is to the user, then focal length of the user is farther from the user than screen 304. If convergence is at screen 304, then the user is likely focusing on screen 304. If the user is focusing closer or farther than screen 304, then the user is likely not looking at screen 304.

System 100 can calculate the gaze direction 116 of the user. The system can calculate gaze direction 116 by forming a vector from a center of eye 404 through a center of the pupil 408. The center of eye 404 can be determined by detecting a face and/or detecting landmarks on the face to identify a position of eye 404. For example, a machine learning model, such as OpenFace, can be used to identify landmarks on the face and/or eye 404. Landmarks on the face and/or eye can be used to determine a position of the center of the eye 404.

A center of the pupil can be determined by using infrared light. For example, infrared light can be directed to an eye, and the pupil will "glow" in an image acquired by an infrared camera. However, using a camera for pupil detection that is used to detected visible light (e.g., a camera in a smartphone or a camera used for video conferencing), under various lighting conditions, can be challenging. To use a camera that takes images of visible light, it can be observed that the center of the pupil is also the center of the iris. Eye regions can be extracted from images based on landmarks of the face. For example, in some machine learning models six landmarks can be identified around each eye, excluding the pupil. A portion of an image defined by a polygon having the six landmarks as vertices can be cut from an image. In some embodiments, two polygons, one for each eye, are cut from the image to form two extracted regions. Detecting an outline of an iris can be done using an extracted region.

An outline of the iris can be detected using machine learning or image processing. For example, image processing can include applying a dynamic threshold algorithm, morphological image processing, contour detection, ellipse fitting using RANSAC or Convex-Hull, and/or checking ellipse constraints. An outline of the iris can thus be found by detecting a gradient change (e.g., a threshold change in color, brightness, saturation, etc. over a threshold distance) indicative of a boundary between the sclera and the iris of the eye. An ellipse fit (e.g., using a best fit algorithm) to the outline of the iris estimates the outline of the iris. A center of the ellipse can be used to estimate the center of the iris, which would indicate the center of the pupil. A check can be made if an ellipse can be found in an extracted region of an image. If an ellipse cannot be found, another image can be used. A line can be drawn from the center of the eye through the center of the pupil to determine gaze direction 116. Pupil displacement 416 can be calculated by the difference between the center of eye 404 and the center of pupil 408 in an image plane of a sensor of camera 112.

In some embodiments, after determining a center of the pupil, a size of the pupil can be identified by analyzing an area of an image between the center of the pupil and the outline of the iris for a second gradient change. The second gradient change might be difficult to identify in the image as a whole, but by narrowing image analysis to an area within the iris, the second gradient change is more likely to be identified. A second ellipse can be fit to the second gradient change to determine a size (e.g., diameter) of the pupil. In some embodiments, both eyes of the user 104 are tracked. Pupil tracking is described in greater detail in certain embodiments described below; for instance, with respect to FIGS. 11-32.

Gaze Controlled GUI Interaction and Visual Element Selection

Gaze tracking may be useful for determining what content a user is looking at on a screen. This can be used to determine screen time exposure and predict or diagnose eye fatigue, or in some cases, gaze tracking can be used to determine which visual element at a particular location a user wants to execute and/or interact with. Various methods can be used to determine a user's intent to interact with a particular element, such as tracking when the user blinks (e.g., long blinks, double blinks, etc.) or voice commands. In some aspects, a user may provide an input to an input device (e.g., button press on a remote control, computer mouse, keyboard, etc.) to indicate an intended user interaction, which can often provide a more reliable indication of a user's intent over other methods, and particularly when the input device can be visually associated with the user, as further described in the embodiments that follow.

Figure 5:
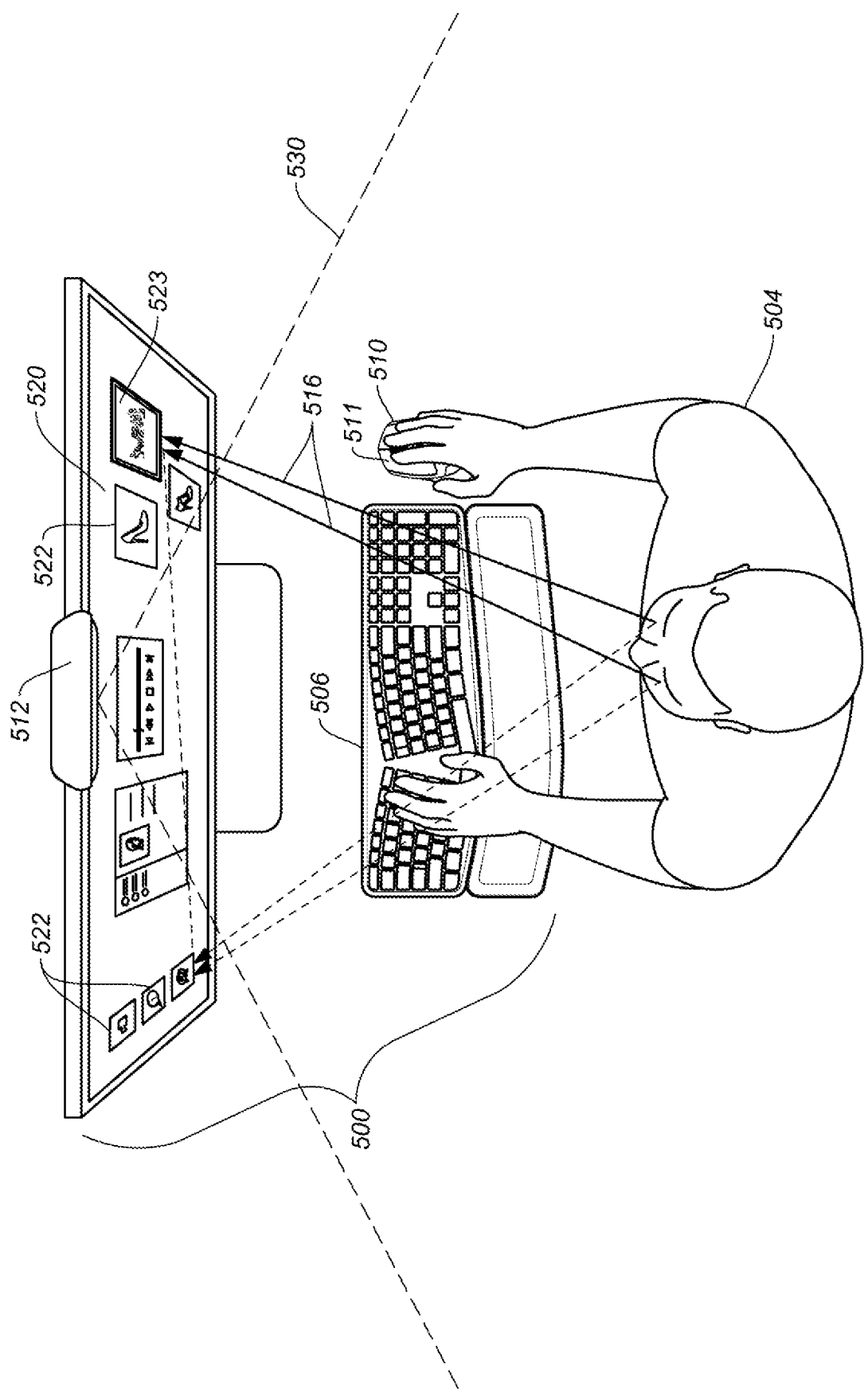
FIG. 5 shows a gaze detection system for tracking a gaze of a user and selecting a visual element on a display, according to certain embodiments.

FIG. 5 shows a gaze detection system 500 for tracking a gaze of a user 104 and selecting a visual element 522 on a display 520, according to certain embodiments. User 504 is holding an input device 510 with one or more input elements. Display 504 includes a number of visual elements 522 displayed thereon that may include, for example, active or passive windows, icons, media interfaces, and the like. User 504 is shown visually scanning display 520 over multiple visual elements from left-to-right and ending on a particular location on display 304 (e.g., visual element 523). The system may track the gaze of user 504 via camera 512 (or any suitable image sensing system) over a corresponding field-of-view 530.

After traversing display 520, user 504 may indicate an intent to interact with visual element 523 by providing a confirmation input to the system. The confirmation input can be provided via input device 510 (e.g., a computer mouse and/or a keyboard). For example, one or more input elements (e.g., buttons, touch sensitive areas, switches, light sensitive areas, microphones, etc.) on input device 510, when activated (e.g., pressed, swiped, touched, switched, voice activated, etc.), may cause input device to send a confirmation input to the system (e.g., processing subsystem 1002 of FIG. 10), which may indicate that the user intends to interact with (e.g., execute, open a file, select an icon) a visual element at a location on the display that the user is currently fixating their gaze. The system can then generate and effectuate an input command (e.g., open a file, select an icon, launch an executable file, etc.) based on the location on the display the user is directing their gaze at the time that the confirmation input is received from input device 510. As previously indicated, a user's gaze 516 (also referred to as "gaze direction") may be tracked for a single eye or both of the user's eyes. A non-limiting example of a system configured for gaze tracking in the manner described in this disclosure is presented below with respect to FIG. 10.

Input device 510 can be any suitable device for providing a confirmation input. Some non-limiting examples of input device 510 can include a computer mouse and/or keyboard (as shown), a presenter device, remote control (see e.g., FIGS. 6-7), head-mounted display, smart wearables (e.g., glasses, watch, jewelry), or the like. In some aspects, multiple input devices can be used to provide the confirmation input. For instance, a button press on a computer mouse (e.g., left button), a key press on a keyboard (e.g., a function key), and a user's audio cue detected by a microphone on a remote control may all be configured to provide a confirmation input as described above. The input device(s) may provide the confirmation input wirelessly (e.g., Bluetooth™) or through a physical connection (e.g., Universal Serial Bus). In some aspects, a confirmation input may be provided by the camera device itself. For instance, camera 512 may include a microphone to detect when the user provides an audio cue to operate as a confirmation input. Thus, a standalone or separate input device would not be necessary to provide a confirmation input in such cases. One of ordinary skill in the art with the benefit of this disclosure would appreciate the many modifications, variations, and alternative embodiments thereof.

Gaze Tracking with Multiple Users

Figure 6:
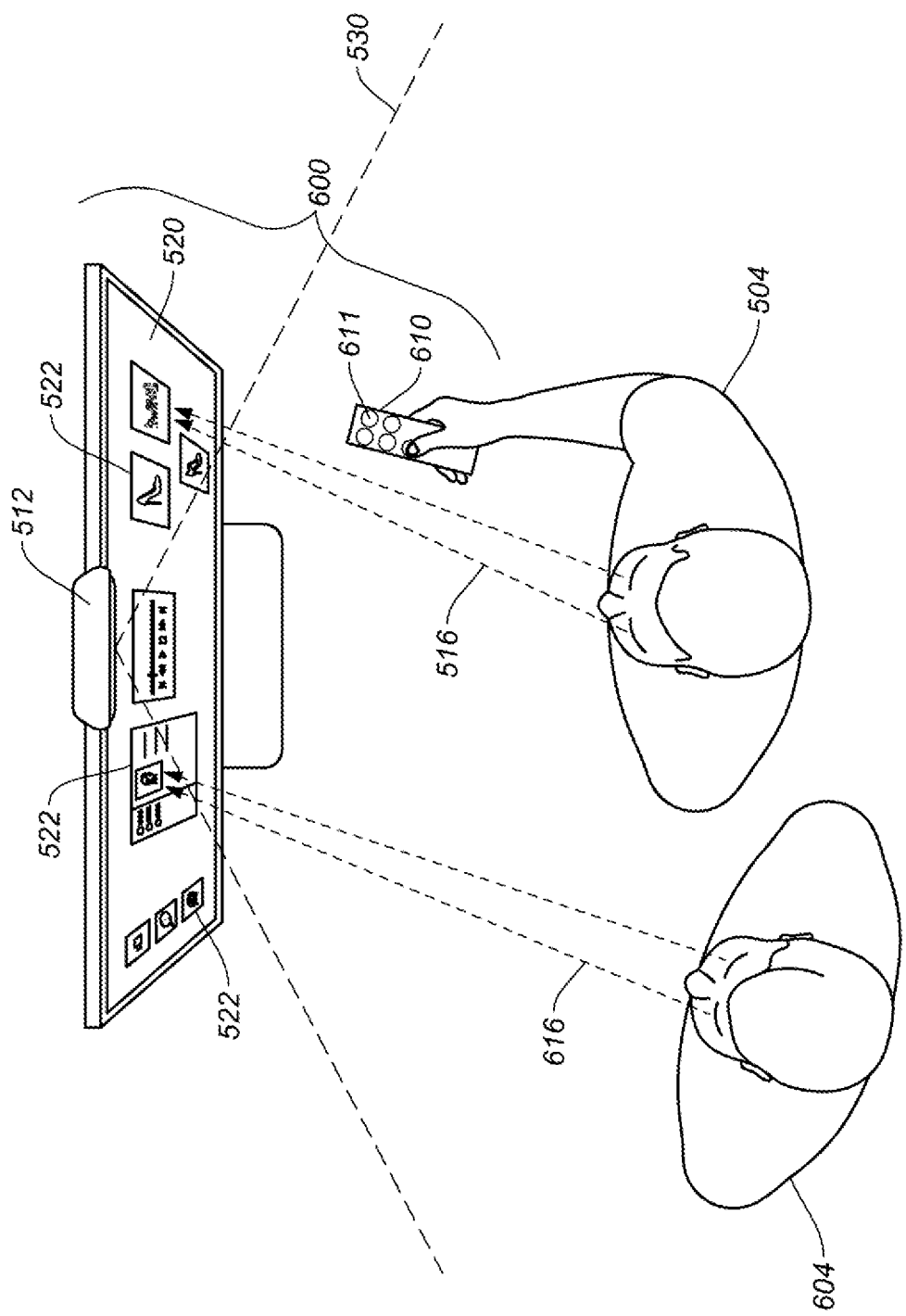
FIG. 6 shows a gaze detection system that is tracking multiple users and objects simultaneously, according to certain embodiments.

FIG. 6 shows a gaze detection system 500 that is tracking multiple users and objects simultaneously, according to certain embodiments. The gaze detection system shows both a user 504 and bystander 604 scanning over various visual elements on display 520, according to certain embodiments. User 504 is shown holding an input device 610 (e.g., a remote control) with one or more input elements. The visual elements 522 may include, for example, active or passive windows, icons, media interfaces, and the like. In some instances, the field-of-view 530 of camera 512 may be wide enough to allow system 500 to perform gaze tracking on multiple people. Referring to FIG. 6, system 600 uses camera 512 to perform gaze tracking on both user 504 and bystander 604. In these instances, system 500 is tasked with determining which visual element(s) a user may want to interact with (e.g., execute, open a file, select an icon) and which tracked person is providing the confirmation input.

In some embodiments, system 500 may both receive confirmation input data from input device 610 and track a location of input device 610 when it is within the field-of-view 530. Referring to FIG. 6, input device 610 is operated within the field-of-view 530 of camera 512. The gaze detection system may be configured to correlate a location of the user (e.g., the user's face, body, etc.) to a location of the input device, which may be used to establish a likelihood (e.g., confidence level) that the detected user is providing the confirmation input on the input device. As described above, in some scenarios where multiple people may be within a field-of-view (FOV) 530 of camera 512, system 500 may track the gaze of more than one person, making it more challenging to determine which input command to generate and effectuate if each detected person is looking at a different visual element on the display, even with the use of an input device as it may not be clear which person is entering the confirmation input. However, correlating the location of the input device with a particular person (e.g., determining that user 104 is holding/manipulating the input device) can help the system determine whose tracked gaze should be used to generate and effectuate input commands. Correlation may be based on a number of different factors including a distance between the input device and a user, relative movements of the user and the input device (e.g., positive correlation may be determined if the systems detects that the user has moved to the left within FOV 530 by 1 meter and the input device has also moved in kind (e.g., moved to the left by 1+/−0.1 meters)), detected user gestures (e.g., user performs particular gestures, such as an uncommon head movement, that indicates that she is controlling the input device), detect user head/body orientation, speech angle origin (e.g., if the user speaks towards the device), previous interactions (e.g., if the user has just operated the device, then a positive bias relative to that user can be established), or other suitable factors.

Although the embodiments depicted herein generally depict simplified systems that utilize a single camera for user track, one of ordinary skill in the art with the benefit of this disclosure would appreciate the many modifications, variations, and alternative embodiments thereof. For instance, some embodiments may employ multiple cameras over multiple FOVs that may have overlapping or discontinuous coverage to track one or more users and input devices. Alternatively or additionally, multiple microphones may be used to track a location of one or more people and/or input devices within the FOV of the camera (512) or over a different range using audio beamforming. In some cases, the system may use accelerometer data (e.g., via an inertial measurement unit (IMU)) from the input device to provide tracking data for correlating the input device with a particular user.

User Authentication in Gaze Tracking

Figure 7:
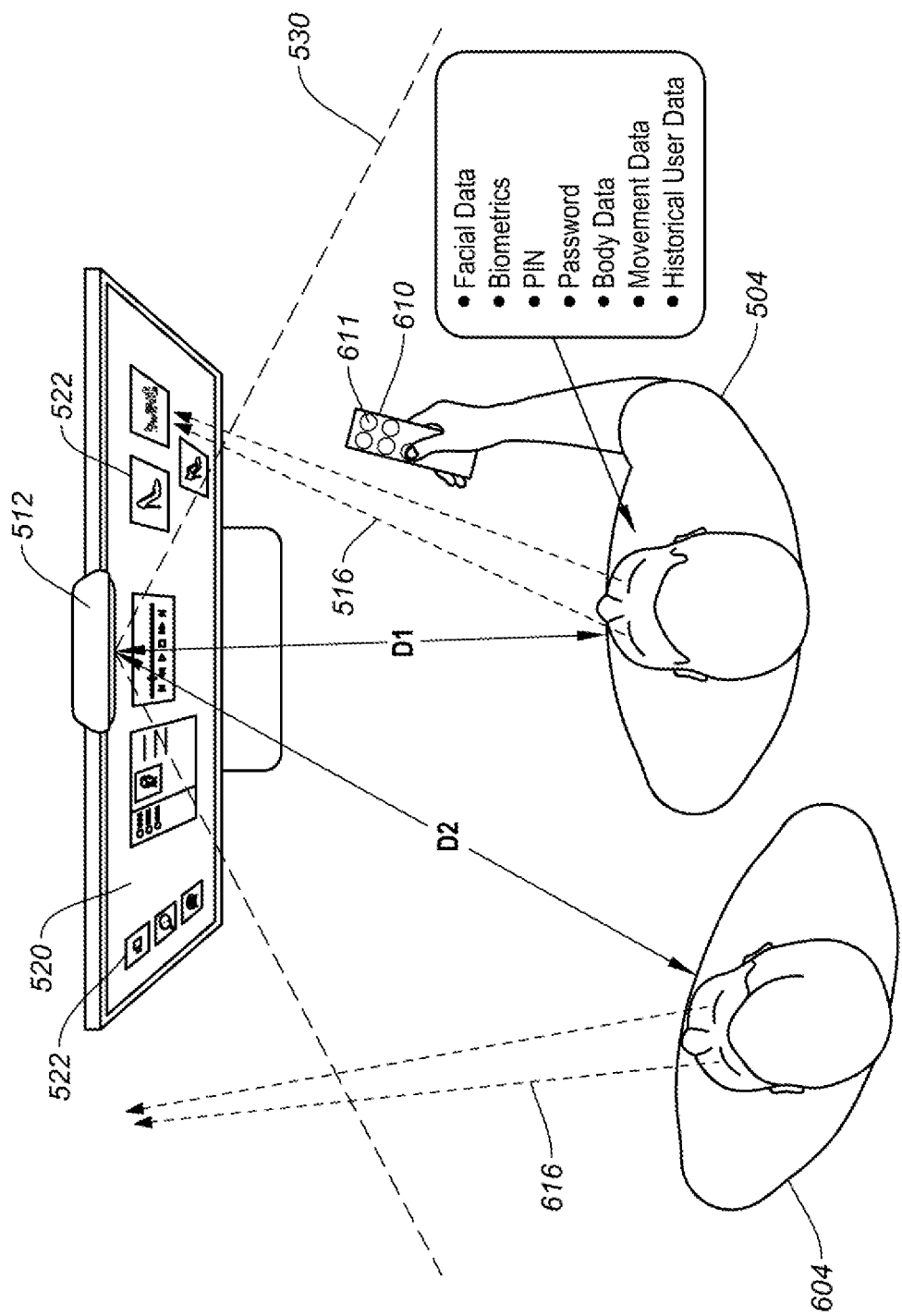
FIG. 7 shows aspects of user detection using various authentication techniques, according to certain embodiments.

FIG. 7 shows aspects of user detection using various authentication techniques, according to certain embodiments. Additional methods of authentication can further increase a system confidence level that a detected user is the correct person that should be interfacing with the visual elements on a corresponding screen and not an unintended bystander. This can be particularly useful in scenarios where an input device may not be within a FOV of camera 112, or the input device may be visually obstructed. The term "authentication" in the present disclosure can mean determining that a particular detected person is, in fact, the correct person (e.g., an authorized user) that should be interacting with the system and not, for example, a bystander.

Referring to FIG. 7, a gaze detection system 500 detects both user 504 and bystander 604 scanning over various visual elements on display 520, according to certain embodiments. User 504 is shown holding an input device 610. The visual elements 522 may include, for example, active or passive windows, icons, media interfaces, and the like, as described above. In some instances, a field-of-view 530 of camera 512 may be wide enough to enable system 600 to perform gaze tracking on multiple people. System 600 uses camera 512 to perform gaze tracking on both user 504 and bystander 604. In the example shown, input device 610 is held by user 504 within FOV 530 of camera 512, but user 504 is holding it in a position that obstructs the line of site of camera 512, such that system 600 may not be able to correlate the position of input device 610 with user 504, as described above at least with respect to FIG. 6.

In some embodiments, one or more credentials of an authorized user may be used to help system 600 identify a particular user. For the purposes of this disclosure, an "authorized user" is a person that the system 600 has identified as an approved user of system 600 and not, or instance, a bystander or a person that should not have access to the system. Credentials are typically provided to the system before a user can be authorized. Credentials can include any data that can be used to identify and authenticate an authorized user.

In certain embodiments, credentials may include user biometric information. For example, facial feature data can be used to authenticate a detected user. Facial feature data can include data about the user's eyes, nose, facial structure, ears, etc., that may be used to authenticate a user interacting with display 520. In some cases, body dimensions may be used separately or in conjunction with facial feature data. Body dimension data related to a person's height, relative size, body dimensions that compare features (e.g., shoulders, arms, ratios, etc.) relative to one another may be used for authentication. In some cases, a user may be wearing a badge that can be scanned to determine who the active user should be. In certain embodiments, the user's clothing or hairstyle can be used to uniquely identify them for a session.

In some cases, system 600 may select gaze tracked input for a particular user out of a plurality of gaze tracked individuals based on their relative distances to camera 512, according to certain embodiments. For instance, a gaze tracked person that is located closer to display 520 than other gaze-tracked people in some office computer settings may be more likely to be the intended user of system 600 than a person farther away. Referring to FIG. 7, user 504 is located at a distance D1 from camera 512, and bystander 604 is located at a distance D2 from camera 512. System 600 may be configured to select the tracked interaction of user 504 with display 520 over bystander 604 when user 504 is closer to camera 504. User distances can be tracked by camera 512 or any suitable method (e.g., audio tracking, smart device tracking, image sensors on other systems, etc.), as would be appreciated by one of ordinary skill in the art with the benefit of this disclosure.

System 600 may select a gaze tracked input for a particular user out of a plurality of gaze tracked individuals based on their orientation, according to certain embodiments. For example, system 600 may determine that a tracked person that is looking at display 520 may be more likely to be an intended user than a tracked individual that is not facing the display and act on gaze tracking data accordingly. In some aspects, a user may further be selected based on an amount of time they are looking at the screen. For instance, system 600 may select a gaze tracked input from a first person that has been looking at display 520 longer than a second gaze-tracked person. In some scenarios, system 600 may analyze gaze behavior to determine which gaze-tracked input to implement. For example, system 600 may determine that a person that appears to be gazing at more visual elements on display 520 than other detected people in the FOV may be more likely to be an authorized user. In some implementations, system 600 may display a selectable icon on a screen for each detected person so that designated tracked user can be manually selected.

In certain embodiments, an active user may be identified based on their relative distance from a detected input device, as described above. Some input devices (e.g., remote controls) may emit IR bursts, which may be detectable by camera 520. The input device may be located in a FOV based on the detected IR burst. Similarly, an active user may be identified in part (e.g., increase the confidence value) based on tracked user's location relative to the detected IR burst. For instance, an IR burst that overlaps a particular user may be likely indicative of the active user operating the input device, as would be appreciated by one of ordinary skill in the art with the benefit of this disclosure.

Figure 8:
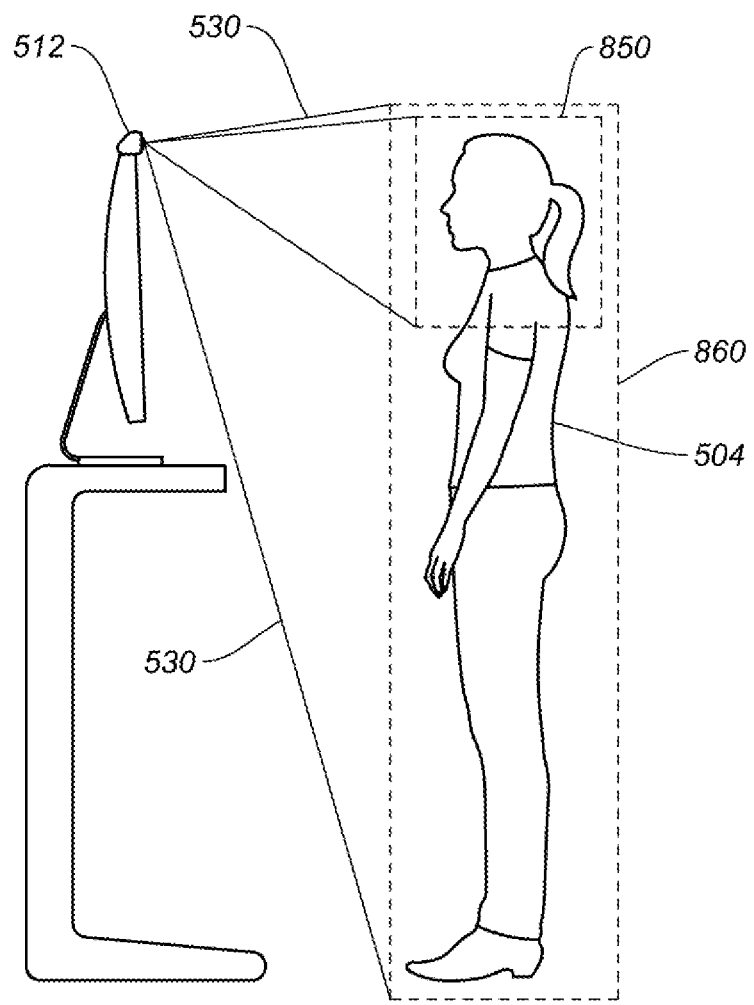
FIG. 8 shows aspects of authentication and improved processing efficiency in gaze tracking, according to certain embodiments.

FIG. 8 shows aspects of authentication and improved processing efficiency in gaze tracking, according to certain embodiments. Gaze detection system 600 shows both user 104 and bystander 604 within FOV 530 scanning over various visual elements on display 520. In some embodiments, it may be computationally expensive to track multiple people within a field-of-view in real-time. Thus, some embodiments may limit tracking to within a bounding box entered around a tracked user 504. In exemplary embodiments, the bounding box(es) may be centered around and substantially limited to user 504 (e.g., within a few centimeters of a user's head, the user's head and body, etc.) such that image data corresponding to people, objects, or events other than user 504 are not processed or are ignored, thereby reducing an overall computational cost of gaze tracking because less overall image data (and gaze data from one subject) is being processed. Referring to FIG. 8, a first bounding box 850 is centered around user 504's head, and a second bounding box 860 is centered around user 504's body.

In some embodiments, a user's tracked gaze (e.g., tracked pupils/irises) may be correlated with a location of a user's head and/or body (with or without a corresponding bounding box) to increase a confidence level that a tracked gaze of a user has not inadvertently switched to a gaze of a bystander. The positional relationship between a user's head and body is likely to remain substantially consistent (within certain tolerances due to a body's normal range of motion) when compared to a location of other people within a field-of-view. The head (or tracked pupils) and body relationship may be more relevant in instances where the user and bystanders may be moving about and/or changing positions. By way of example, if a user's tracked pupil(s) appears to move from a first location to a second location (e.g., 0.5 meters away), and the user's tracked body has moved substantially the same vector (e.g., direction and distance), system 600 may have an increased confidence value that the tracked pupil's still correspond to the user. In contrast, if a location of a user's tracked pupils diverges from a location of the user's tracked body beyond a threshold distance (e.g., 0.2 m or other suitable distance), then system 600 may determine that there is a reduced confidence value that the user's tracked pupils do, in fact, correspond to what system 600 recognizes as user 504.

Alternatively or additionally, system 600 may increase a confidence level by tracking movement characteristics of user 504. Movement characteristics (e.g., referred to as movement data, which may be extracted from observation data, or data collected within the FOV of the image sensor, such as camera 512) may correspond to a movement of the user's head, body, or both. Movement characteristics may include physical habits or user tics such as sudden, repetitive, non-rhythmic motor movement or vocalization involving discrete muscle groups that system 600 may be configured to recognize and track using machine learning algorithms, as would be appreciated by one of ordinary skill in the art with the benefit of this disclosure.

In some aspects, a tracked location of the user's head and/or body can be stored, recalled, used, etc., for determining a historical context of where the user is likely to be or where the user is likely to return to when the user is momentarily out of the field-of-view (e.g., user ducks down to pick up a paper or leans outside the FOV). The historical context can be used to calculate a probability (e.g., confidence level) that the user that enters back into the FOV is the intended active user.

Figure 9:
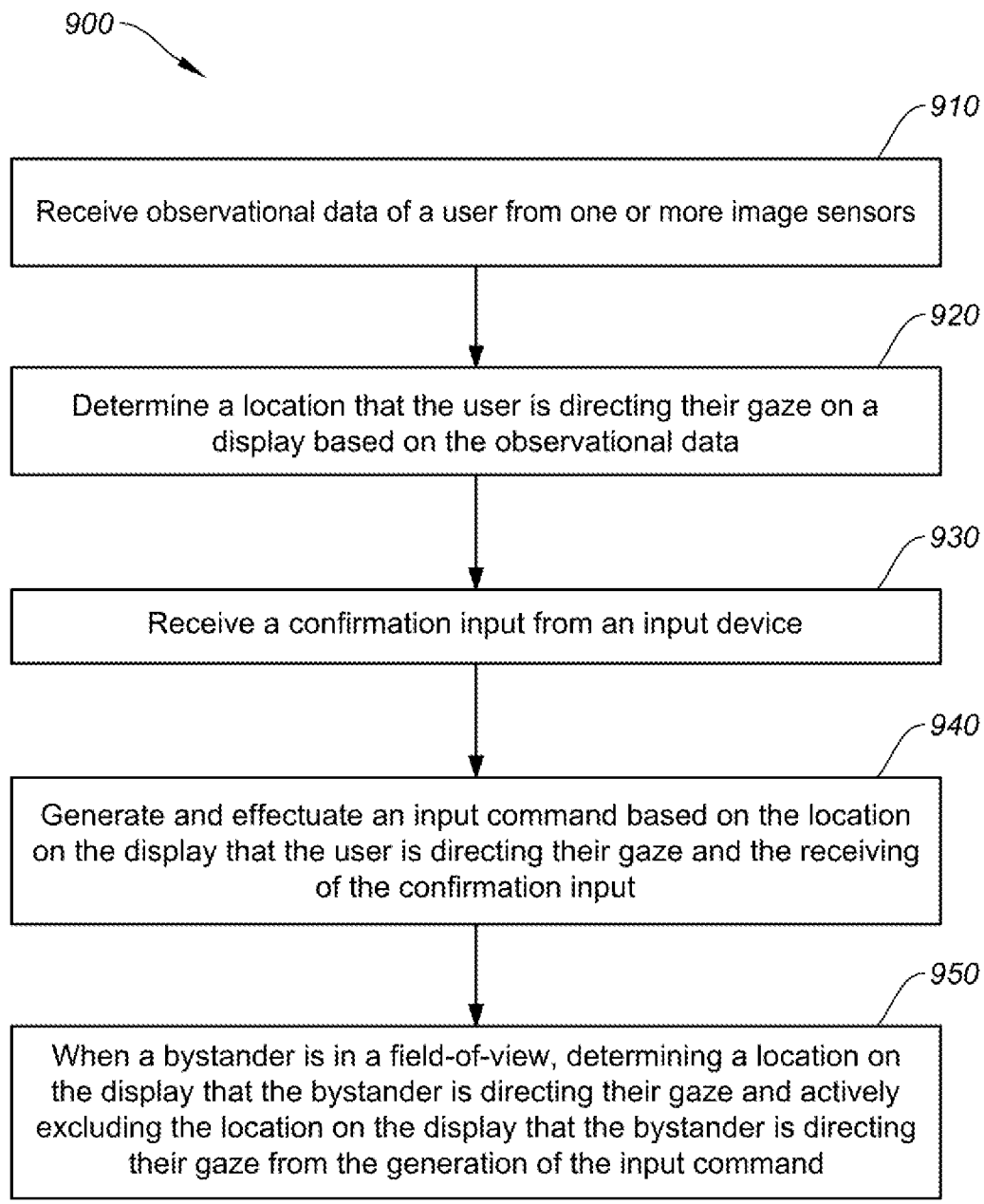
FIG. 9 is a simplified flow chart showing aspects of a method for tracking a user's gaze, according to certain embodiments.

FIG. 9 is a simplified flow chart showing aspects of a method 900 for tracking a user's gaze, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by aspects of processing subsystem 1002 of FIG. 10, or any of the systems described above with respect to FIGS. 1-8 (e.g., system 500, system 600, etc.).

At operation 910, method 900 can include receiving observational data of a user from one or more image sensors, according to certain embodiments. The one or more image sensors may include one or more cameras (e.g., camera 512) and typically an RGB image capturing device, as further described above. Observational data (sometimes referred to as "visual data") may include any image data captured by the image sensor(s). For instance, observational data can include any image data within a field-of-view of the image sensor(s), which may include a user and multiple bystanders, for example. Observational data can include image data of the user's iris(es)/pupil(s) such that system 600 can determine what direction the user is gazing therefrom. Observational data that includes pixels of the user's iris(es) and/or pupil(s) can be referred to as "user gaze data" or "gaze data." In some aspects, observational data can include image data corresponding to one or person's head and/or body, other people (e.g., bystanders), objects, or other environmental objects within a field-of-view of the one or more image sensors.

At operation 920, method 900 can include determining a location that the user is directing their gaze on a display based on the observational data, according to certain embodiments. In some aspects, system 600 can draw a line from the center of the eye through the center of the pupil to determine a user's gaze direction 116 (e.g., where the user is directing their gaze). Pupil displacement can be calculated by the difference between the center of eye and the center of pupil in an image plane of a sensor of the one or more image sensors (e.g., camera 512), as further described above with respect to FIGS. 1-4 and 11-31.

At operation 930, method 900 can include receiving a confirmation input from an input device, according to certain embodiments. Input device 610 can be any suitable device for providing a confirmation input. Some non-limiting examples of input device 610 can include a computer mouse, keyboard, presenter device, remote control, head-mounted display, smart wearables (e.g., glasses, watch, jewelry), or the like. The input device may include one or more input elements (e.g., buttons, touch sensitive areas, switches, light sensitive areas, microphones, etc.) that, when activated (e.g., pressed, swiped, touched, switched, voice activated, etc.), may cause input device to send a confirmation input to the system (e.g., processor(s) of processing subsystem 1002 of FIG. 10), which may indicate that the user intends to interact with (e.g., execute, open a file, select an icon) a visual element at a location on the display that the user is currently fixating their gaze. The confirmation input may be received via any suitable medium (e.g., wireless communication, wired communication, etc.), as would be appreciated by one of ordinary skill in the art with the benefit of this disclosure.

At operation 940, method 900 can include generating and effectuating an input command based on the location on the display that the user is directing their gaze and the receiving of the confirmation input received, according to certain embodiments. Some non-limiting examples may include opening a file, selecting an icon, launching an executable file, manipulating a control element (e.g., on a media player), selecting/deselecting elements on a graphical user interface, and the like, as would be appreciated by one of ordinary skill in the art with the benefit of this disclosure.

In some cases, when a bystander is in a field-of-view of the one or more image sensors, the observational data may include bystander gaze data (e.g., pixels capturing the bystander's tracked pupil data) that indicates where the bystander is looking. In such cases, at operation 950, method 900 can include determining a location on the display that the bystander is directing their gaze and actively excluding the location on the display that the bystander is directing their gaze form the generation of the command, according to certain embodiments. That is, system 600 can track multiple people including a direction/location that their gaze is directed to within a field-of-view, but system 600 may be configured to generate an input command based only on the user's tracked gaze and the confirmation input.

In some embodiments, the observational data can further include facial recognition data of the user. In such cases, method 900 may further include performing a periodic facial recognition analysis of the user based on the observational data (e.g., this may include pixels including the user's face, which may be referred to as facial recognition data) and confirming that the detected user is the user and not the bystander based on the periodic facial recognition analysis. Facial recognition data may include data about various dimensions of a user's face, such as a distance between the user's eyes, a width of the nose, depth of eye sockets, shape of cheekbones, length of jawline, size/shape of ears, or the like, as would be appreciated by one of ordinary skill in the art with the benefit of this disclosure.

In certain embodiments, the observational data can include facial data corresponding to a relative distance that a face of the user (or multiple faces) is to the image sensor(s) (e.g., camera 512). In such cases, method 900 can further comprise confirming that the detected user is the user and not the bystander based on a detected face of a plurality of detected faces that is closest to the display or facing the display. In some embodiments, tracking a location of the user's face can be based on the observational data of the detected user and calculating and periodically updating a confidence score that indicates a likelihood that the detected user is the user and not the bystander based on the tracked location of the user's face.

In further embodiments, method 900 can include limiting the tracking the location of the user's face to a bounded region located around a last detected location of the user's face, as shown and described above with respect to FIG. 8, and ignoring and/or not using observational data corresponding to outside of the bounded region. In some aspects, tracking a location of a face and body of the user based on the observational data of the detected user, and calculating and periodically updating a confidence score based on the tracked location of the user's face and body that indicates a likelihood that the detected user is the user and not the bystander.

It should be appreciated that the specific steps illustrated in FIG. 9 provide a particular method 900 for tracking a user's gaze, according to certain embodiments. Other sequences of steps may also be performed according to alternative embodiments. Furthermore, additional steps may be added or removed depending on the particular applications. For example, method 900 may further include tracking a location of the input device via the image sensor and calculating and periodically updating a confidence score based on the tracked location of the input device relative to the user that indicates a likelihood that the detected user is the user and not the bystander. In some aspects, method 900 may include any of the many different embodiments described, for instance, in the summary section, the claims, or any portion of the detailed description. Any combination of operations can be used and one of ordinary skill in the art with the benefit of this disclosure would understand the many variations, modifications, and alternative embodiments thereof.

The various eye gaze tracking techniques described herein can be used for a number of different applications in both private and public settings. In a private setting, such as where a user is operating personal computer, a single user typically operates the computer and security may be of moderate concern. Using the gaze tracking systems described herein, the user may be operating a keyboard and mouse (e.g., input device), which may out of the field-of-view of a typical webcam (e.g., laptop camera or standalone webcam, as shown for instance in FIG. 5), which may be used for gaze selection (to provide a confirmation input), but typically could not be seen by the webcam to identify who is holding or operating the input device (e.g., to correlate a location of the input device with a location of the gaze-tracked user). Typically, a user may be identified when the user signs on, or the system is woken from a sleep state. User identification may be established via face recognition, a user PIN or password, or the like. For gaze tracking, a user location history (e.g., time and user location-based analysis) may be used to determine where the user is likely to be, or the user's body may be tracked to identify a position of the head, as described above. Face cropping and/or using the closest face or a detected direction of the user's face may be used, as described above with respect to FIG. 7. If two faces are identified at login, system 600 may prompt the user to identify which user to select (e.g., a GUI may provide images of both detected individuals for gaze tracking selection), or use facial recognition tied to user credentials, etc. If a second person enters the field-of-view after the initial login, the system may ignore the second user; track the second user but actively ignore any inputs (e.g., gaze detection) provide by the tracked second user; use the closest face to the display; the closest face looking at the display; gesture detection to select a user (e.g., the user uses their hands to indicate an input or certain characteristic movement by the user (e.g., tics) are detected and associated with the user; or display a notification on a GUI indicating that a new face/person is detected and prompt the user for appropriate actions. One of ordinary skill in the art with the benefit of this disclosure would appreciate the many modifications, variations, and alternative embodiments thereof.

In a business or governmental setting, security may be of a higher concern. The system may incorporate any of the security aspects described above in the personal use scenario, but with more stringent settings. For example, the user may be required to wear a scannable badge that is concurrently identified along with the user. The badge may include a proximity device that can be used to determine when the user is within a range (e.g., 1-2 m) of the system, the badge may have facial recognition or biometric information stored therein that is accessible by the gaze tracking system, etc. One of ordinary skill in the art with the benefit of this disclosure would appreciate the many modifications, variations, and alternative embodiments thereof.

In a public setting, such as with a public kiosk, multiple users may be interfacing with the system and security may not be a significant concern. User voice and/or gesture commands may be used in conjunction with gaze tracking to track a user. Other data, such as the closest user or user facing a particular GUI, a user in a direct line-of-sight, or a selected icon on a GUI indicating which of a number of detected users to perform gaze tracking, can be used to identify which detected individual or individuals should be gaze tracked. In scenarios where the system is configured to only select a single input (e.g., multiple inputs not allowed), an active user may be selected via voice, their location and/or orientation relative to the GUI, or by an initial interaction with the system (e.g., user touched screen, looked at certain portions of the screen at a certain time, the user's physical location, an audio queue, etc.).

In a common area of a home setting (e.g., living room) or in a public setting (e.g., auditorium), a user may be operating an input device (e.g., remote control or presenter device) where the field-of-view of a camera may allow an active user to be identified by determining who is holding the input device. The input device can be identified by line-of-sight recognition via any suitable tracking schema including IR emission detection (e.g., remote controls often use IR control schemes), ultrasound, RF, or the like.

It would be understood by one of ordinary skill in the art that the various inventive concepts presented herein (e.g., at least with respect to FIGS. 1-8) can be combined in any suitable manner. For instance, the various methods of combining bounding boxes as described above with respect to FIG. 8 can be applied to system 500 of FIG. 5. One of ordinary skill in the art with the benefit of this disclosure would appreciate the many modifications, variations, and alternative embodiments thereof.

Typical System Configured to Implement Gaze Tracking

Figure 10:
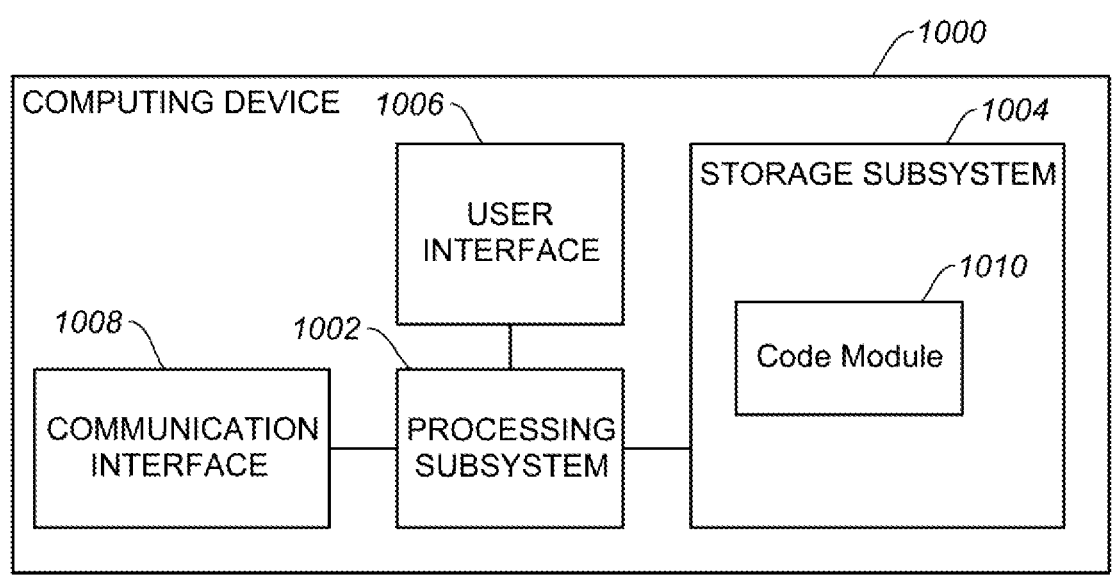
FIG. 10 is a simplified block diagram of a computing device, according to certain embodiments.

FIG. 10 is a simplified block diagram of a computing device 1000, according to certain embodiments. Computing device 1000 can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1010 for implementing one or more method steps described above.

A firmware and/or software implementation may be implemented with modules (e.g., procedures, functions, and so on). A machine-readable medium tangibly embodying instructions may be used in implementing methodologies described herein. Code modules 1010 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 1010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1010 on a general purpose computer system, the general purpose computer is transformed into a special purpose computer system.

Computer programs incorporating various features described herein (e.g., in one or more code modules 1010) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single core or multi core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1000.

Examples of Novel Pupil/Iris Tracking Methods and Implementations

Computer-based eye tracking can be described as the detection and measurement of the point of a user's gaze, which can correspond to where the user is looking. Some contemporary systems rely on computer vision techniques to detect a user's face, eyes, and pupils with a camera. This data can be used to improve human-machine interaction, as knowing where the user is looking may allow the system to anticipate certain user actions. Most contemporary eye tracking systems rely on specific hardware typically involving a head-mounted camera and infrared light. However, a gaze tracking system using a standard RGB webcam would be more universally applicable across most systems, but is subject to greater challenges that aspects of the present invention are designed to resolve.

Figure 11:
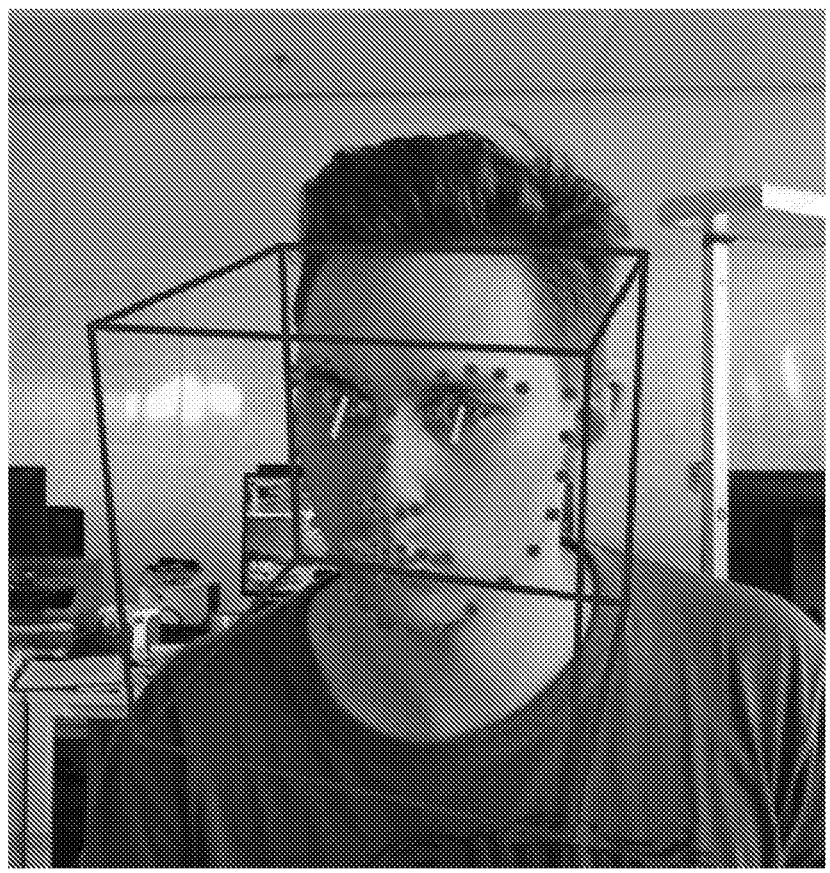
FIG. 11 shows a gaze tracking system that relies on a vector between the center of a user's eye and a corresponding pupil center to determine a direction of a user's gaze, according to certain embodiments.

FIG. 11 shows a gaze tracking system that relies on a vector between the center of a user's eye and a corresponding pupil center to determine a direction of the user's gaze, according to certain embodiments. However, such eye tracking methods may be subject to inconsistent performance characteristics. The novel eye tracking system and methods described herein provide a more robust, accurate, and fast eye tracking detection schema that can track a user's gaze with high precision in real-time and under varying light conditions with standard equipment such as an RGB webcam and standard contemporary computing capabilities. Some embodiments employ novel techniques and methodologies such as the utilization of dynamic thresholding, morphological operators and ellipse fitting to track a user's pupil or other features (e.g., iris, sclera, etc.), as described in more detail throughout this disclosure.

Various human eye features are frequently referred to throughout the present disclosure. As a point of reference, FIG. 12 identifies various anatomical features of the human eye including the eyelid, pupil, iris, and sclera. The iris is heavily pigmented (e.g., brown, blue, green, hazel, etc.) and is a muscle used to constrict or dilate the pupil (e.g., about 3-7 mm). The pupil is the hole through which light passes the human eye. The sclera is the white of the eye area of the eye around the iris. Note that in the present disclosure, eye tracking may also be referred to as "gaze tracking," and may further include "iris tracking" and "pupil tracking" depending on the tracking methodology used, as would be appreciated by one of ordinary skill in the art with the benefit of this disclosure.

Figure 13:
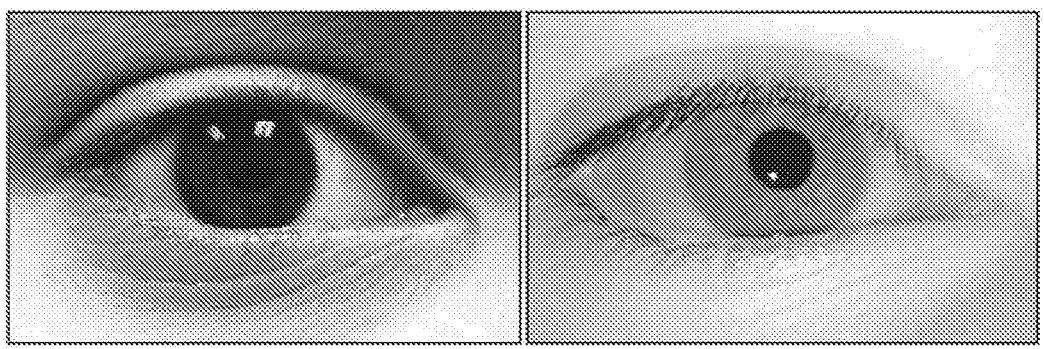
FIG. 13 shows a difference in contrast between a pupil and iris/sclera with normal light conditions and with infrared light conditions.

Some conventional systems use infra-red (IR) light for gaze tracking, which typically provides a significant contrast between the pupil and the iris/sclera making gaze tracking detection relatively easy. However, methodologies that readily perform eye tracking with IR light may not track as accurately or consistently on images from visible light cameras (e.g., webcams), since there is markedly less distinction between the pupil and the iris. FIG. 13 shows a difference in contrast between a pupil and iris/sclera with normal light (left side) and with infrared light (right side) on the same eye. Though aspects of the invention are directed to detecting a pupil center for gaze tracking, some aspects are directed to finding the center of the iris, which corresponds to the same location as the pupil or center of the pupil, but may be generally easier to track as RGB images typically have a stronger distinction between the iris and sclera, than between the pupil and iris, particularly for user's with dark iris colors.

Contemporary methods may rely on detecting candidate contour points of the iris and then applying a random sample consensus to fit an ellipse to the points, with the goal of having the ellipse accurately overlap the boundary of the iris and thus promoting accurate gaze tracking. These methods are often fraught with inaccurate and inconsistent results. Aspects of the invention improve upon these methods of accurately identifying the boundary of the iris, pupil, or other eye feature (a technical problem) by further relying on dynamic thresholding, morphological operators, using ellipse size constraints, iterating ellipse generation (e.g., two or more passes at calculating a better iris matching ellipse, with each pass iterating and improving off of the previous ellipse), and other techniques, and various combinations thereof (i.e., various technical solutions to the technical problem), to more accurately and consistently track the gaze of a user's eye (e.g., fit an ellipse to the user's iris).

Figure 14:
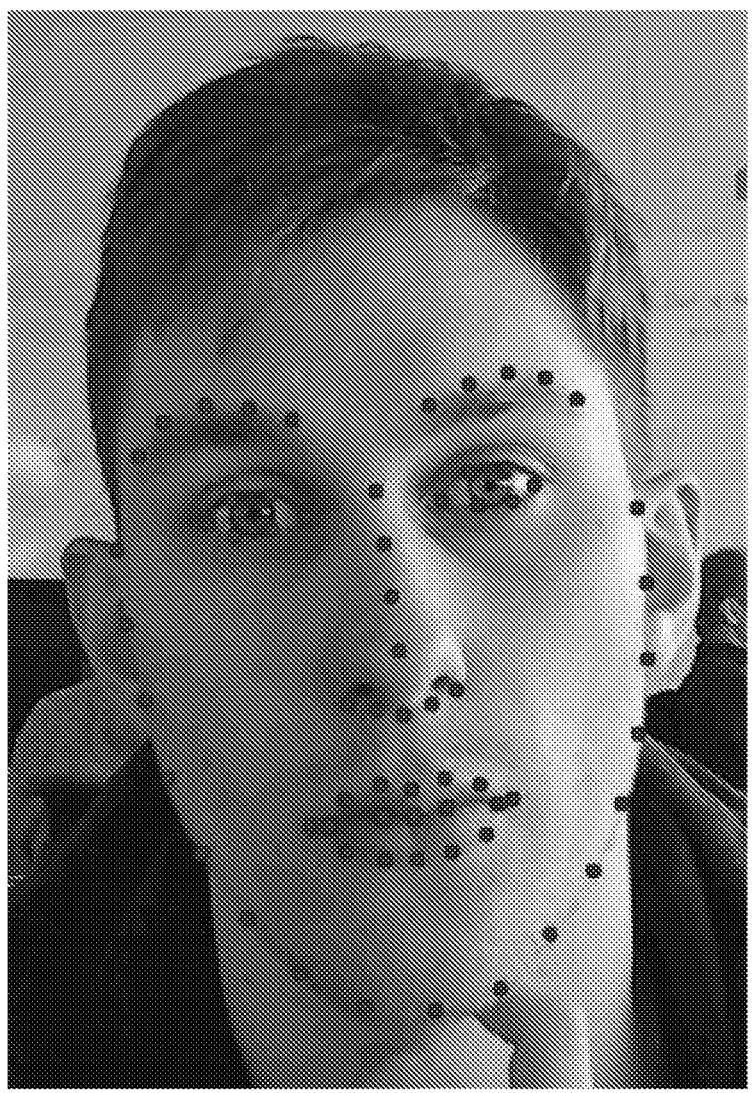
FIG. 14 shows an example of tracked facial landmarks on a user using an arrangement of dots that define certain facial features including the eyes.

To appreciate the novel advancements in eye tracking described herein, some foundational aspects are briefly presented here. Typically, in order to detect the pupil center of an eye, the face and/or the eye or a user is typically detected first. Some existing face tracking methodologies may be used for this purpose. For example, OpenFace (or other suitable face tracking implementation) may be used to track various facial landmarks (e.g., typically 68 landmarks that include contours of the face, nose, mouth, eyebrows, and eyes) with typically six on each eye. From the six eye landmarks, an eye region can be deduced. FIG. 14 shows an example of tracked facial landmarks on a user using an arrangement of dots that define certain facial features, including the eyes.

Figure 15:
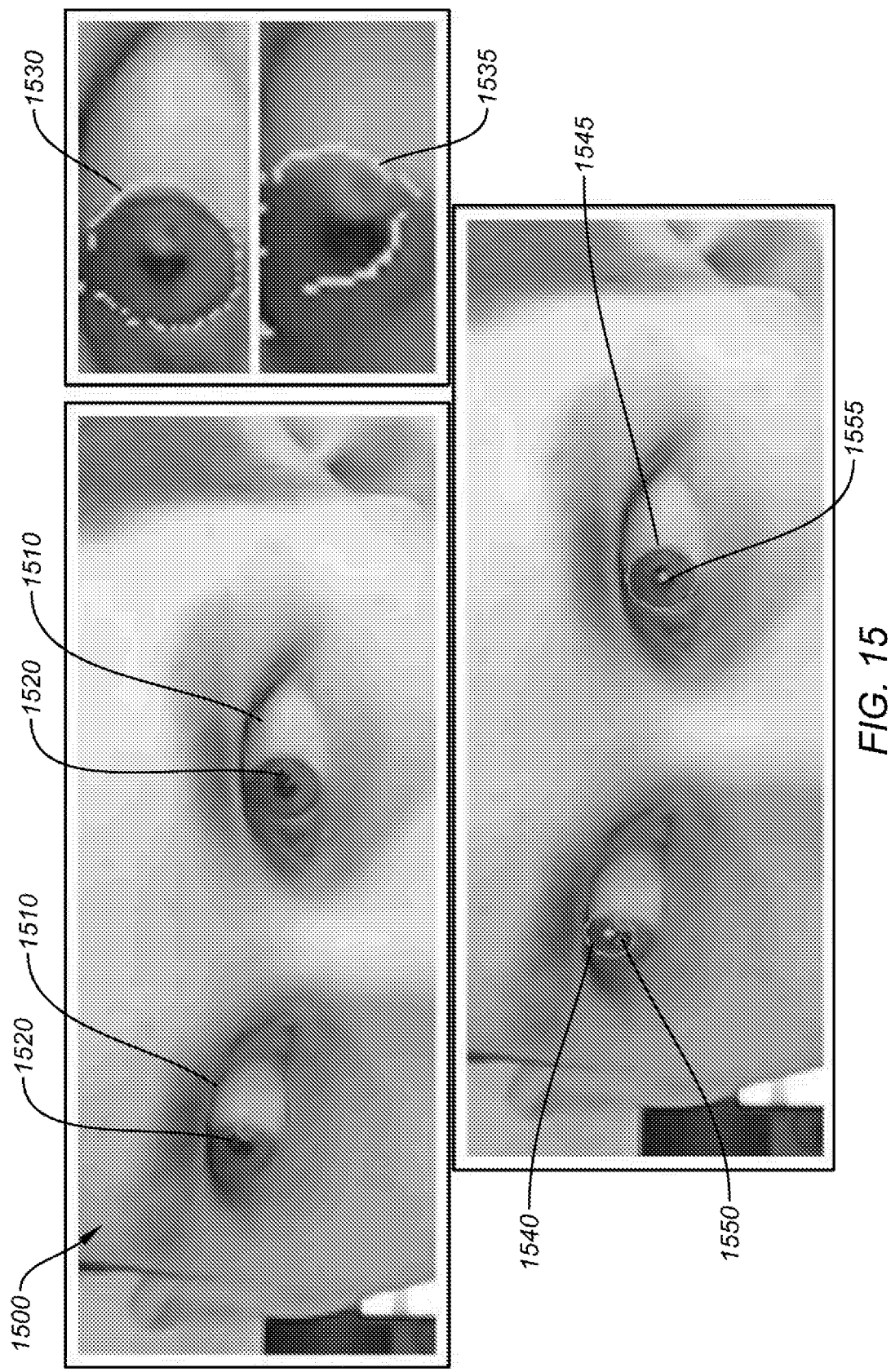
FIG. 15 shows a coarsely detected center of user's iris, candidate iris points, and a resulting calculated ellipse, according to certain embodiments.

Typically, an eye region can first be detected using, for example, an improved Haar-like feature-based method and OpenFace as described above. The methodology can work in two stages to reduce computational complexity. The first stage may detect a coarse iris center using, for instance, Hough Transform filters, as would be appreciated by one of ordinary skill in the art with the benefit of this disclosure. The second stage may rely on the detected coarse iris center to find a possible iris-sclera boundary, for example, by looking at the gradient (e.g., the change in pixel characteristics, such as pixel intensity, color data, etc.) at different distances from the center. Once the landmark candidate points for the eye are found, the eye tracking system (e.g., running a software implementation of a methodology, algorithm, etc.) tries to fit an ellipse on the eye(s) using a suitable method of adaptation (e.g., least-square approximation). Some implementations may use a random sample consensus (e.g., RANSAC) framework to minimize the effect of any detected outliers. FIG. 15 shows results of the basic foundational methodology described above where the rough center of the iris of a user 1500 is first detected (top left image) and then candidate iris points 1530, 1535 are found starting from this rough center (top right images showing candidate iris points on each eye in light blue). The bottom image of FIG. 15 shows the results of this eye tracking methodology on a user's eyes 1510 with the rough center 1520 shown in blue, the detected center and corresponding calculated ellipse 1540, 1545 shown in green, and the actual center 1550, 1555 shown in red.

Improved Coarse Iris Detection

Figure 16:
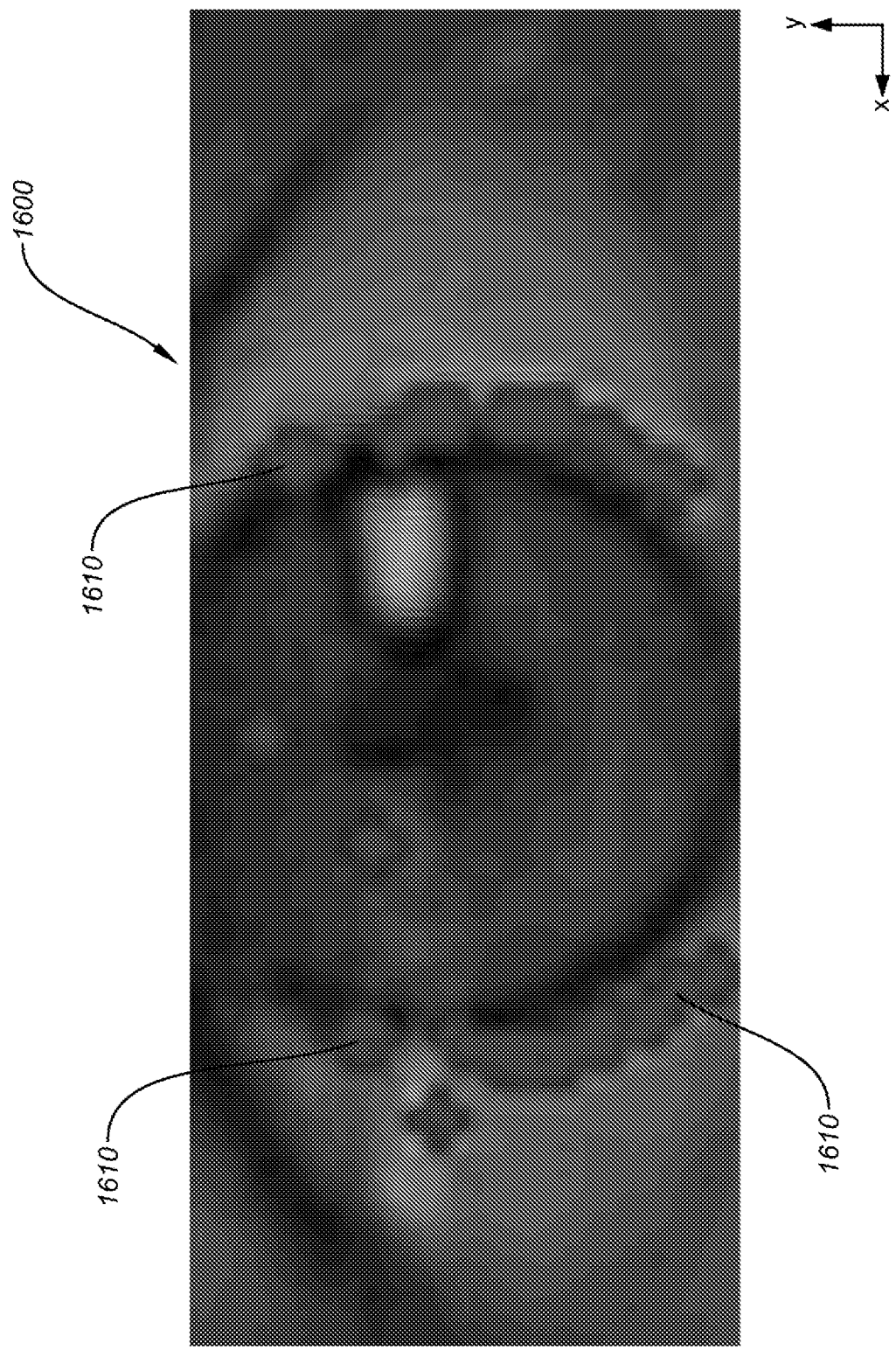
FIG. 16 shows aspects of applying rays from candidate points on the corner of the eyes to determine a contour of an iris, according to certain embodiments.
Figure 17:
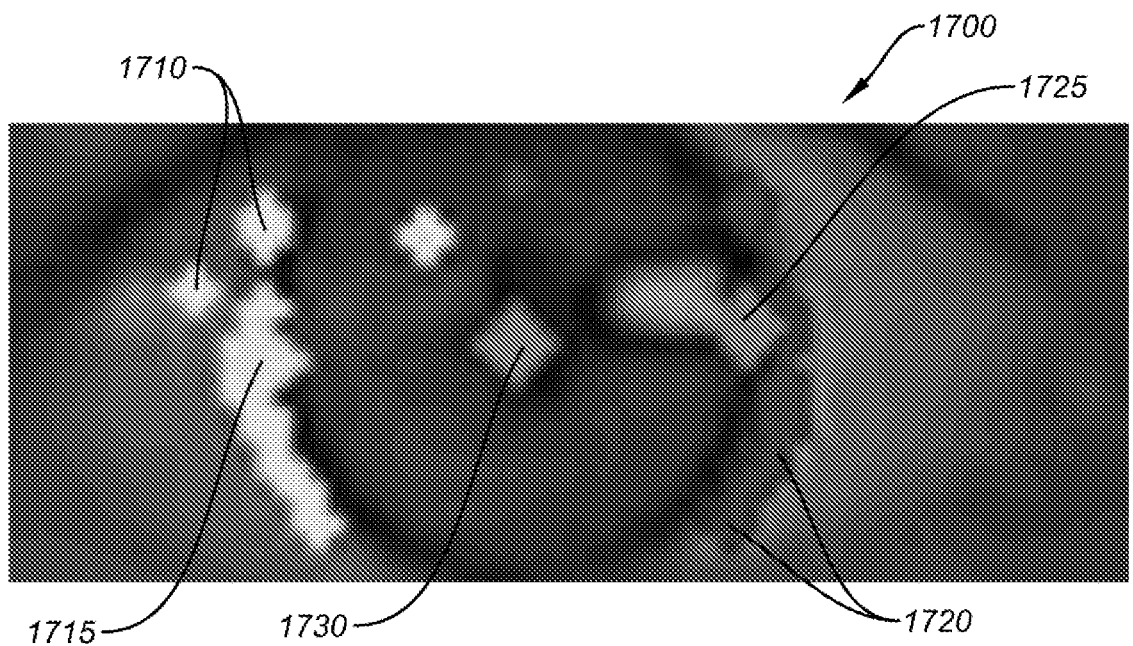
FIG. 17 shows aspects of applying rays from candidate points on the corner of the eyes to determine a contour of an iris, according to certain embodiments.

Some of the new innovations presented herein are directed to the first step of coarse iris detection. Referring back to bottom image of FIG. 15, the detected center points (in green) do not accurately align with the actual iris center points (in red). In some aspects of the present invention, improved methods of coarse iris detection are presented that detect the iris in a different manner. To illustrate, some embodiments may use a mean of the iris (or pupil) landmarks to find a coarse center. The candidate points can be computed by applying rays from the coarse center of the iris and the best candidate points can be kept based on the gradient magnitude and direction of the rays. In other words, a first rough estimation of the pupil location can be computed (e.g., geometrical center of eye landmarks), then radial rays are cast from the estimated pupil in order to find a relevant gradient change (e.g., points on an edge between a bright and dark pixel, such as the sclera/iris edge), and every point that represents a relatively large gradient change (e.g., indicative of a sclera/iris border) can be annotated as a candidate point for the subsequent ellipse fitting operations. In some cases, the eyelids may present a change in the gradient and are often used as candidate points, which may likely lead to a bad ellipse. The coarse center is sometimes substantially off the mark (e.g., misaligned with the real center), which may inadvertently lead the implementation to recognize the pupil-iris border instead as an iris-sclera candidate point. An improvement on the methodology described above can solve this technical problem by applying rays from the corner of the eyes instead, as shown in FIG. 16 with candidate points 1610 arranged around user eye 1600. Such implementations may improve the detected iris-sclera border, but may be subject to having more detected points on one side of the eye than the other wise, resulting in an offset along the x-coordinate. For example, one side may get more candidate points when the user is looking to the side because a visible portion of the iris's edge on that side gets smaller than the other side of the iris, which can result in fewer candidate points, as can readily be seen in FIG. 15. Each candidate point can then be kept according to the side of the eye that they were found. This change enables the system (e.g., system 1000) running software implementing the methodology to compute the mean instead on each side of the eye. The center point of the eye can then be found by averaging the two mean points, as shown in FIG. 17. For instance, two "intermediate" average points 1715 and 1725 lie on different sides of the iris, which is not necessarily diametrically opposite. In the particular example of FIG. 17, a mean 1715 (shown in light green) is computed for the left side iris candidates 1710 and a mean 1725 (shown in green) is computed for the right side iris candidates 1720. The mean values 1715 and 1725 can then be averaged to determine a computed center 1730 (shown in red). The center point, as shown, has a good accuracy on the 'x' coordinate axis, but is off center on the y-coordinate axis because some of the candidate points are not found on the bottom or top of the boundary of the iris in this particular instance, which is typically caused by iris obstruction by the eye lids and may result in a higher or lower positioned candidate point. In other words, left and right side borders of the iris are often very visible, but top/bottom sides are often concealed by the eyelids. Thus, more candidate points on the left/right side and fewer points (in some cases, no points) on the top/bottom sides can result in good x-estimation and poor y-estimations, as seen in the FIG. 17.

Figure 18:
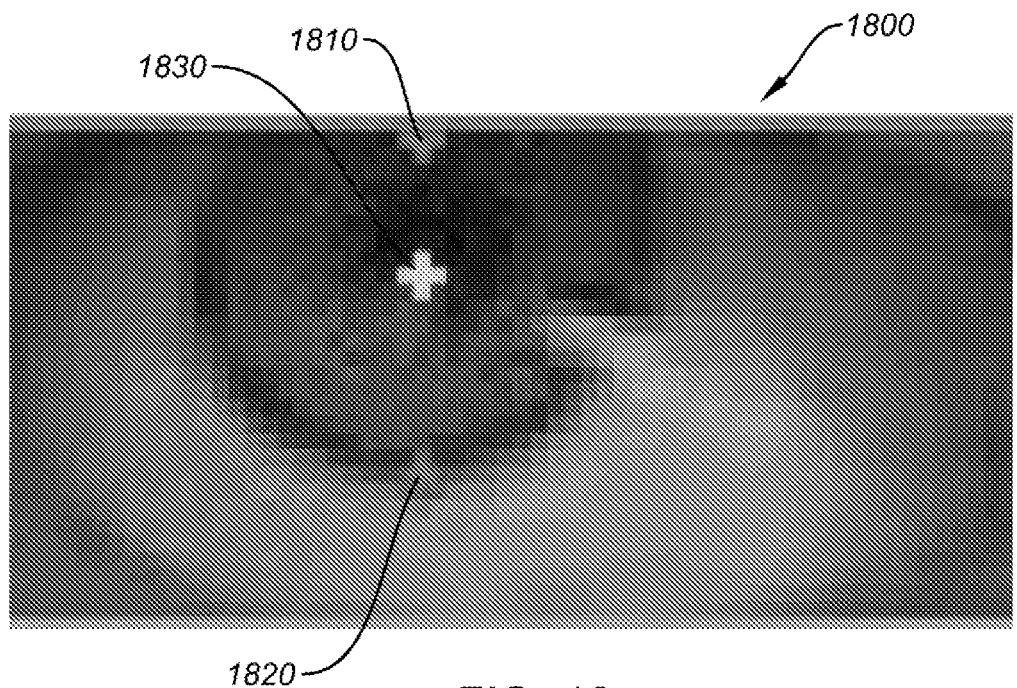
FIG. 18 shows aspects of determining an improved iris boundary on a user, according to certain embodiments.

In some embodiments, a novel method of improving the accuracy of the y-coordinate value can be applied. Because the 'x' value of the computed center is known, it is possible to check every pixel along the x-axis, which allows for the identification of the start and end points of the iris along the x-axis, assuming the start/edit points can be seen and are not obstructed. With these x-axis boundaries, it is then possible to find a more accurate 'y' value for an improved calculated center point. Put another way, after the x-estimation is determined, the system can loop through each vertical point lying at the x-coordinate from 0 to the height of the image looking for the relevant gradient changes (e.g., sclera/iris border). After the lowest and highest points are found, a mid-point may be computed. Referring to FIG. 18, an improved center point 1830 (shown in green) is computed according to the fixed x value, found in the previous steps, and the iris boundary (1810, 1820). It can often be the case that a majority of the errors that remain are typically due to the bad initial candidate point detection along the eyes. It should be noted that a similar methodology can be used in reverse to determine a better x-axis center point using y-axis pixel values, however this scenario is unlikely to have useful applications as the eyelid obstructions described above more likely affect the y-axis calculations due to the physiology of the eye.

Embodiments of the Overall Pupil/Iris Tracking Methodology

Figure 19:
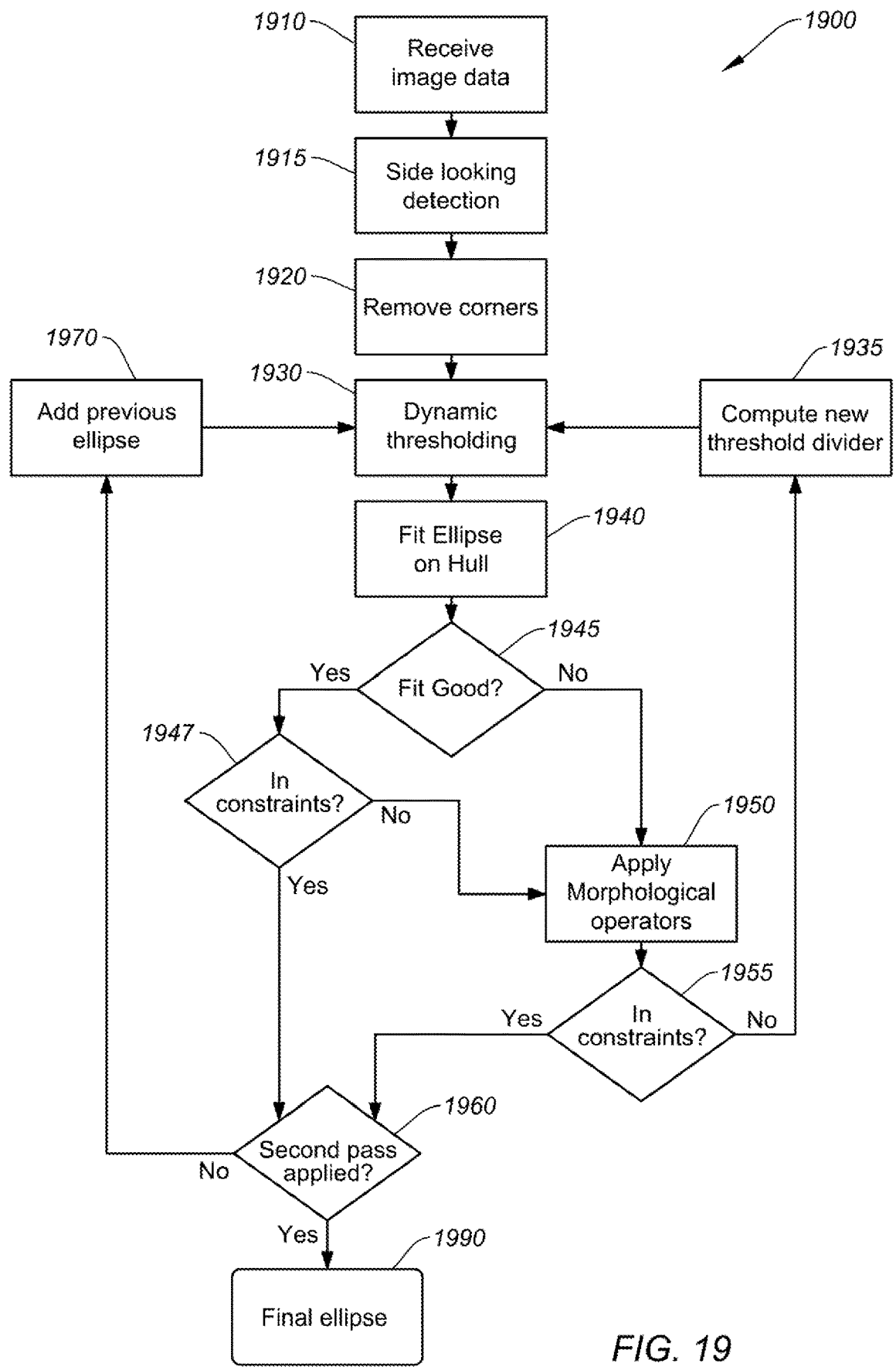
FIG. 19 is a simplified flow chart showing aspects of a method for improved iris/pupil tracking accuracy, according to certain embodiments.

FIG. 19 is a simplified flow chart showing aspects of a method 1900 for improved iris/pupil tracking accuracy, according to certain embodiments. Method 1900 can be performed in real-time by processing logic that may comprise hardware (circuitry, dedicated logic, etc.), software operating on appropriate hardware (such as a general purpose computing system or a dedicated machine), firmware (embedded software), or any combination thereof. In certain embodiments, method 1900 can be performed by aspects of system 1000 (e.g., processing subsystem 1002), or a combination of systems, as would be appreciated by one of ordinary skill in the art with the benefit of this disclosure. The following description of method 1900 is a cursory description of each operation to provide a high level overview. Each of the individual operations will be described in further detail in the description and following figures that follow.

At operation 1910, method 1900 can include receiving image data, according to certain embodiments. The image data is typically video data or individual images that includes at least a user's face within a field-of-view. The image data may include landmark candidate points for the user's face, preferably including landmark candidate points for the user's eye. In some embodiments, the image data may typically include 68 facial landmarks with at least 6 landmarks per eye, although other distributions and number of landmarks are possible. In some implementations, the image data may include all color channels (of the individual red, green, and blue content of the image) or a subset thereof. In exemplary embodiments, the red channel data is preferred as the red data can provide better distinction between the iris and pupil than the green and blue channels.

At operation 1915, method 1900 can include performing side looking detection, according to certain embodiments. In some cases, image data may include a person looking to the side without moving their head, resulting in their iris being positioned in a corner and the sclera only being viewable on one side of the iris. Some embodiments can use this information to remove part of the image, especially when the eyelids and eyelashes are well seen, which operates to remove large white portions of the eye in the image analysis, which can contribute to a better fitted ellipse on the iris, as shown and further described below in greater detail with respect to FIG. 21.

At operation 1920, method 1900 can include removing corners from the detected eye region of the image data, according to certain embodiments. For example, eye landmarks can be used to identify the boundaries of the eye, and further determine the corners and remove them, which can operate to remove some or all of the eyelids from the analysis. This process can help improve the image analysis by focusing more on the sclera-iris relationship, than factoring in the eyelids, which can lead to bad ellipse fitting as described above. Removing corners is further described below with respect to FIG. 21.

Figure 12:
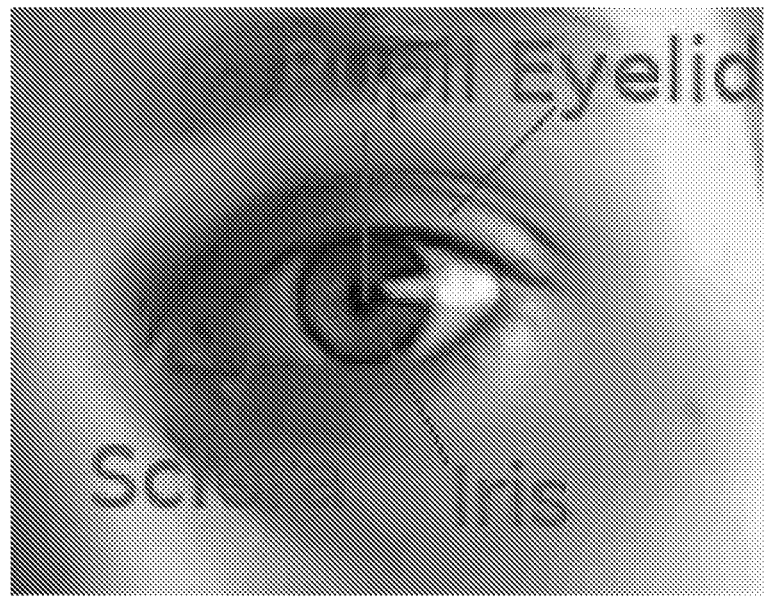
FIG. 12 identifies various anatomical features of the human eye including the eyelid, pupil, iris, and sclera.

At operation 1930, method 1900 can include performing a dynamic thresholding process on the resulting image, according to certain embodiments. In some aspects, the threshold used is found according to the minimum and maximum grayscale values of the pixels in the edited (e.g., corner removal applied) image(s). These values can be added together and then divided by a specific value (the "divider value" or "threshold divider value"). In some cases, the threshold divider value may be set to 2 in the first iteration, although other initial values may be used (e.g., typically 1.5-2.5). The resulting value (e.g., min+max grayscale value/divider value) can be the "threshold value." The grayscale values of the pixels of the edited image data that are smaller or equal to the threshold value can be reassigned a value of 0, corresponding to black. Pixels that are greater than the threshold value may be reassigned to 255, which is white. The black and white-only pixels can create a strong contrast that can be used to identify the iris/sclera border, although it is possible to use reassigned numbers other than 0 and 255 (e.g., 10 and 250) and still achieve a strong contrast. Note that the divider value will change with multiple iterations, as described in the next steps and description below (e.g., see FIG. 12 showing thresholding using different divider values).

At operation 1940, method 1900 can include generating and fitting an ellipse on the convex hull, according to certain embodiments. A convex hull (also referred to as a convex envelope or closure) can be a set of points X in a Euclidean plane/space that is a smallest convex set that contains X. For instance, when X is a bounded subset of the plane (e.g., the combination of the iris and sclera with dynamic thresholding), the convex hull may be visualized as the shape enclosing X. In scenarios where multiple regions are found, typically the biggest one is kept, which should correspond to the iris/sclera region of the edited/thresholded image data. Many implementations of computing a convex hull exist, as would be appreciated by one of ordinary skill in the art with the benefit of this disclosure. In some implementations, computing the convex hull may be based on a computation provided by OpenCV® or other suitable methodology.

At operation 1945, method 1900 can include determining whether the ellipse fit is good, according to certain embodiments. This typically corresponds to whether the ellipse closely matches the boundary of the iris without deviating too far into the iris or sclera. To determine a "good" fit, once an ellipse is computed, the ellipse can be checked on its axes and its center. For instance, every axis may be evaluated to be "good" if the axis is smaller than 4⁄7 of the width of the image, and bigger than ⅓ of the height. The center should be within the image as well. If these criteria are not fulfilled, the ellipse may be rejected (deemed a "bad" fit). When the fit is determined to be good, method 1900 continues to determining whether the fitted ellipse falls within a set of constraints (operation 1947), as further described below. If the fitted ellipse does fall within constraints, and the fit looks good, then it is determined whether this fitting was the first pass, or whether two or more iterations have been performed (operation 1960). If the current iteration is the first iteration, then method 1900 proceeds with using the first iteration ellipse (operation 1970) and applying dynamic thresholding again, going back to operation 1930 to repeat the process. Typically, a second pass is conducted even if the fit is good. One difference between the first and second pass is that the second pass includes segmenting the image (one of the first steps in the process) by taking into account not only the eye landmarks, but also the ellipse region found in the first pass. If at least two iterations have been performed and the ellipse fits good and is within constraints, the fitted ellipse may be considered the final ellipse (operation 1990) and method 1900 ends. Note that once the iris is determined with the final ellipse, gaze tracking can be performed, for instance, as described above at least with respect to FIGS. 1-10.

At operation 1945, when the fit of the ellipse on the iris is determined to be good, but not within constraints (operation 1947), then method 1900 may proceed with applying a set of morphological operators on the thresholded, edited image data, and refitting an ellipse on the resultant convex hull, according to some embodiments (operation 1950). Morphological operators may be described as tools that allow a system (e.g., system 1000) to analyze and process geometrical structure (e.g., in our case, in a black and white image post-thresholding). Any suitable morphological operator can be used to improve the form of the ellipse and its corresponding fit on the iris. In some embodiments, the operators may include both open and close-type operators. Open operators ("opening operators") can be configured to remove noise outside of the shape, while close operators ("closing operators") can be configured to remove noise inside of the shape, as shown for example in FIG. 27, and further described below. Morphological operators may also be applied when the fit is good (operation 1945), but not within constraints (1947).

At operation 1955, the image is analyzed after the morphological operators are applied (operation 1950) to determine if the resulting ellipse is now within specified constraints. When the ellipse is determined to be within constraints, then method 1900 may proceed with the second pass determination of operation 1960. When the ellipse is determined to not be within constraints, a new threshold divider value is applied (operation 1935). In some aspects, the edited image may be used to apply a wholly new iteration without a history of the previous pass. Alternatively or additionally, the good fit ellipse with morphological operators but not in constraints may be used (the first or previous pass ellipse). Note that method 1900 can be performed in real-time using previously stored, streaming, or live-fed image data even with modestly performing computing devices due to the highly efficient and low computational expense of the method, as described above at least in the recitation of the various technical solutions to the presented technical problems that this disclosure is addressed to.

It should be appreciated that the specific steps illustrated in FIG. 19 provide a particular method 1900 for improved iris and/or pupil tracking accuracy, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Presented in a more simplified manner and abridged to aptly convey some of the basic ideas of novelty described herein, method 1900 (and parts of method 3300 described below) can be summarized, in part, in the following manner:
1. Receive red-channel image data of an eye region.
2. Remove the corners from the eye region.
3. Apply dynamic thresholding.
4. Find the convex hull and fit an ellipse.
5. If ellipse fit is bad, apply morphological operators and apply step 4.
6. Go to 3 and repeat process above until good.
7. Apply the whole process once again, using previous result (for second pass).

An Example of an Application of the Pupil/Iris Tracking Methodology

Figure 20:
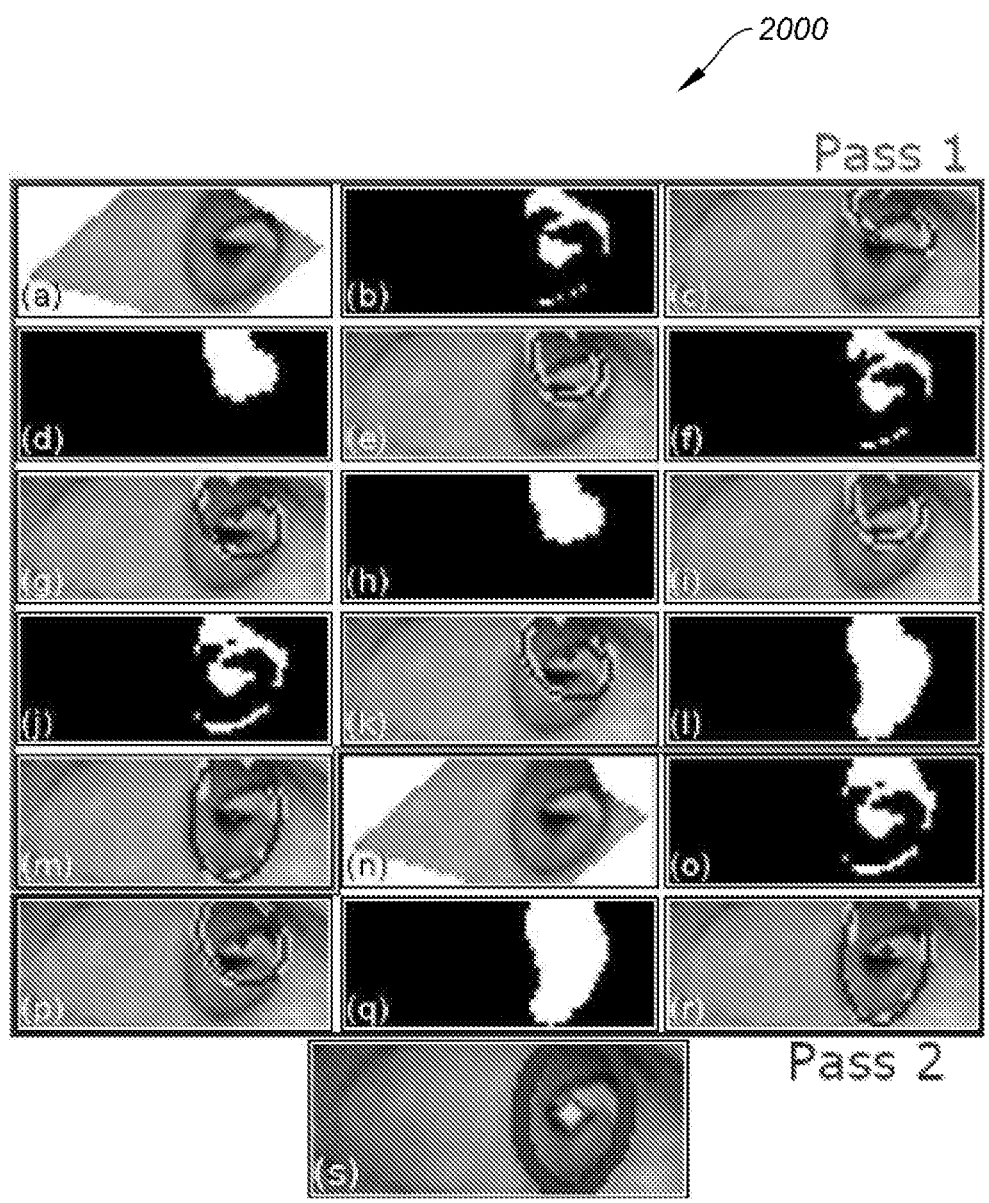
FIG. 20 shows a sequence of step-by-step outcomes resulting after various operations in an iris tracking method, according to certain embodiments.

FIG. 20 shows a sequence 2000 of step-by-step outcomes resulting after various operations in an iris tracking method, according to certain embodiments. Specifically, FIG. 20 presents a series of 18 images (in "pass 1") that correspond to the different operations described above with respect to FIG. 19, method 1900. The ellipses (attempting to fit the iris) and their centers (corresponding to the center of the pupil) are shown in blue and are fitted according to convex hull points shown in green. The final image ("pass 2") shows a real center in red, the detected center in green, and the corresponding ellipse in blue.

In FIG. 20, image (a) corresponds to a starting grayscale image, with the red channel selected and the corners removed from the image of the eye (e.g., operations 1910, 1920). In image (b), dynamic thresholding (operation 1930) has been subsequently applied (e.g., using a divider of 2), and an ellipse is computed and fitted (operation 1940), as shown in image (c). In image (c), it is readily seen that the ellipse is a bad fit (operation 1945) and/or not within constraints (operation 1947), thus morphological operators (image (d)) are applied (operation 1950) that yield the ellipse shown in image (e). The resultant ellipse has improved, but is still not good or within constraints (operation 1955), so the threshold divider is changed to a different value (e.g., 1.9; image (f)) to compute a new ellipse, as shown in image (g). The same principle continues with successive iterations on images (h)(i)(j)(k) until the method reaches a divider of 1.8 and applies the morphological operators, shown in image (l), to find an ellipse within constraints, as shown in image (m). The next (e.g., second) pass can then start by adding image (m) to the corner image data (shown in image (a)) to yield image (n). To further explain, the first pass may result in a good estimate of the iris such that adding the ellipse in the second pass may yield more of the iris being captured outside a boundary of the removed corners, as seen in image (n), which can provide a better resultant fit. The method then applies a threshold using a divider of 1.8 until it finds the ellipse on the morphological operators, which is shown in images (o)(p)(q)(r). The best of images of image (r) and image (m) is kept (image (s)), by looking at the most circular ellipse. The most circular ellipse may be computed, for example, based on the eccentricity of the ellipse (e.g., the ratio of the axes), however more sophisticated methods of computing a "most circular" ellipse can be used, as would be appreciated by one of ordinary skill in the art with the benefit of this disclosure.

The following sections provide a more detailed account of the various operations performed in method 1900.

Corner Removal

Figure 21:
FIG. 21 shows aspects of corner removal on an eye region, according to certain embodiments.

FIG. 21 shows aspects of corner removal on an eye region, according to certain embodiments. As described above, eye region data with facial landmark data (specifically eye landmark data) is received first. Typically, red channel image data is preferred as the red channel provides more distinction (contrast) between the iris/pupil and the rest of the eye. Using the eye landmarks, the corners are then removed forming diamond patterns, as shown in FIG. 21. The removal of the corners can result in the new eye region being more focused (centered) on the sclera-iris region with the eyelids removed (cut out), as shown in the left image. Eyelids can often skew ellipse computations that can lead to poor results, as described above. In some cases, however, corner removal may also remove some information about the iris such that some of the iris may be occluded (as shown in the right image), which can also lead to poor results such as a poorly sized and fitted ellipse.

Dynamic Thresholding

Figure 22:
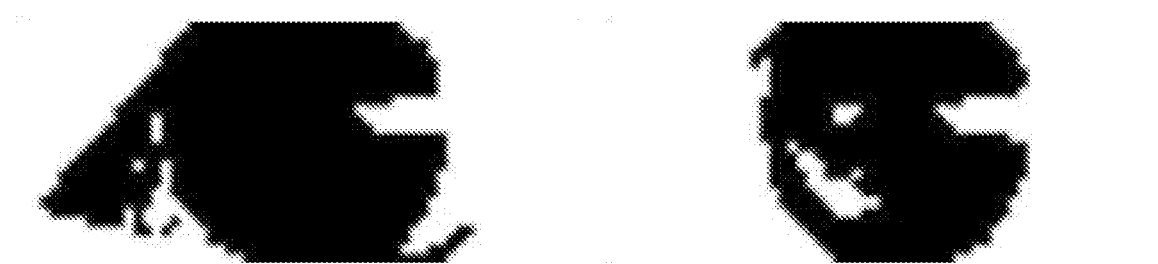
FIG. 22 shows an example of dynamic thresholding using different divider values, according to certain embodiments.

In some embodiments, dynamic thresholding can be determined based on the minimum and maximum pixel grayscale values in the resulting image data (e.g., the red-channel eye region data with corner removal). In certain implementations, the grayscale values can be added together and divided by a specific value, referred to as the threshold divider (or "divider value"), which is typically equal to 2 in the first pass, as described above. The resulting value can be the threshold value. In the typical case, grayscale values of the image data that is smaller or equal than the threshold value are reassigned a value of 0, corresponding to black. The grayscale values of the image data that are larger than the threshold value are typically reassigned to 255, which corresponds to white. Note that the divider value may change according to the results in the subsequent steps as described above, which can result in each classification (e.g., the reassigned black or white pixels) increasing or decreasing in subsequent applications of different thresholds. FIG. 22 shows an example of dynamic thresholding using different divider values, according to certain embodiments. The image on the left is using a divider value of 2, and the image on the right is using a divider value of 2.5. Note that the thresholding may be referred to as "dynamic" since new thresholds may be applied with each iteration of the ellipse. As indicated above, different dynamic thresholds are often used with successive iterations of the ellipse. For example, a first pass may have a dynamic threshold divider value of 2, and a subsequent pass (e.g., typically with image data modified by the first pass ellipse) may have a higher or lower threshold divider value, based on aspects of the first pass ellipse, as further described below. In some cases, a second (or any subsequent ellipse) may be referred to as a "refined" ellipse.

Ellipse Fitting and Constraints

In certain embodiments, an ellipse may be fitted on the corresponding points. Ellipse fitting is often performed using a least-squares approximation, as would be appreciated by one of ordinary skill in the art with the benefit of this disclosure. Because the ellipse is approximated, two checks can be made to determine if the ellipse is a "good" fit, according to certain embodiments.

Figure 23:
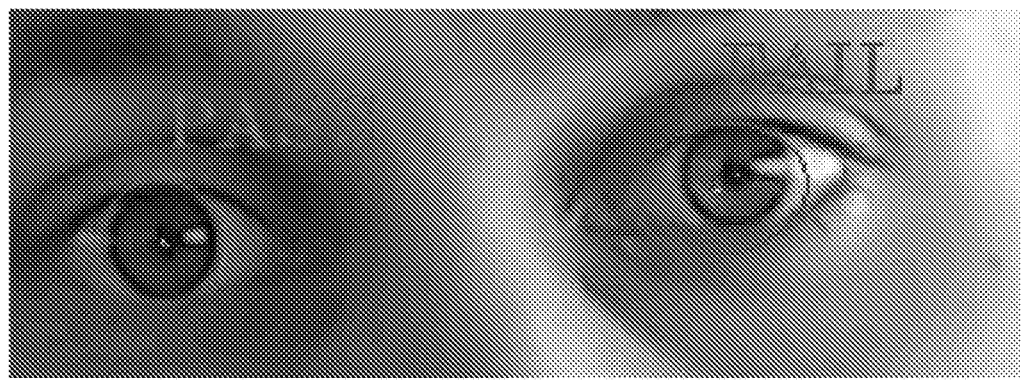
FIG. 23 shows aspects of good and bad fitting ellipses in an iris/pupil tracking system based on a size of iris constraints, according to certain embodiments.

A first check corresponds to a size of the ellipses x and y axes. Typically, the resulting axes should be within a specific range to be accepted as a good fit. This range may rely on the size of the eye region. In some implementations, the maximum size of the axes of the ellipse may correspond to 4/7 of the width and the minimum size to 1/3 of the height. This constraint check is typically made each time an ellipse is fitted to an eye region, as shown in FIG. 23, which shows a passing fit ("good" fit) and a failing fit ("bad" fit) based on the size constraints. For example, after an ellipse is found, the dimensions (e.g., in pixels) of the axes can be checked. Note that each ellipse has two axes forming an area defined by the ellipse. Both of the axes should measure at least 4/7 of the width of the image and at least 1/3 of the height of the image (e.g., if the image is 60 pixels tall and 210 pixels wide, the axes of the ellipse should be within 20 and 120 pixels) in order to register as a "good" fit. Other criteria are possible (e.g., different threshold measurements for the axes), as would be appreciated by one of ordinary skill in the art with the benefit of this disclosure.

Figure 24:
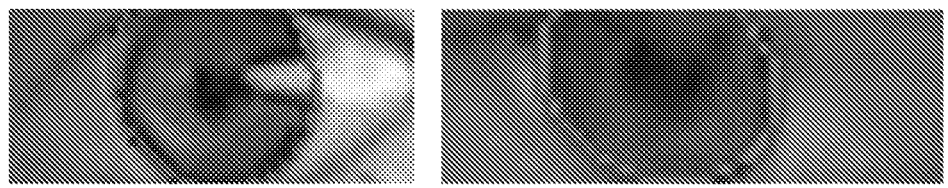
FIG. 24 shows examples of a good and bad fit for an ellipse on a user iris, according to certain embodiments.

In some aspects, a second check can be made to compute the accuracy of the approximation (the fitted ellipse). For every point used (e.g., the contour points found after thresholding and before the convex hull), the distance to the fitted ellipse can be computed. The distance may be normalized according to the number of points. When the normalized distance is too big (e.g., bigger than 0.05), the ellipse is determined to be a bad fit or a "fail." This check is typically made when applied directly on the threshold image, as shown in FIG. 24, which shows an image on the left where the ellipse fits the point well with a normalized distance of 0.04, and an image on the right that does not fit well, with a normalized distance of 0.72. To further illustrate, when an ellipse is fit on to a set of points, the found ellipse could in some cases be far from the base points, and in some worst case scenario may not touch any of the base points. To avoid this, after the ellipse is fit, there can be a check to make sure that the ellipse is actually close to the base points. A "normalized distance check" can be used which may include computing the distance of every point in the ellipse found, averaging it to the number of points, and comparing it to a threshold value. If it is above the threshold value, then the ellipse may be rejected accordingly. The threshold value can be any suitable value, as would be appreciated by one of ordinary skill in the art with the benefit of this disclosure.

Convex Hull

Figure 25:
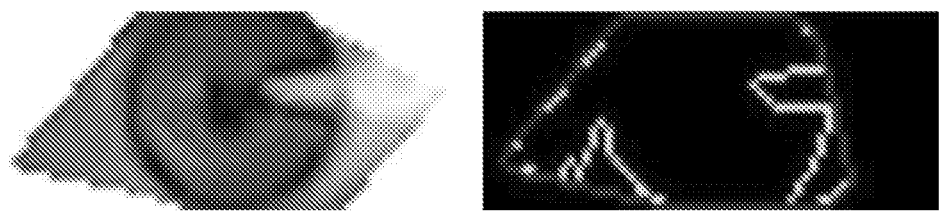
FIG. 25 shows a computation of the convex hull, according to certain embodiments.

After thresholding and/or morphological operators are applied, the contour of the resulting shapes can typically be identified. In some cases, multiple regions can be found, but the biggest region is typically kept with others discarded. Once these contour points (e.g., those found after thresholding and before the convex hull) are detected, the convex hull can be computed. FIG. 25 shows a computation of the convex hull, according to certain embodiments. The image on the left is the original image. The image on the right shows a convex hull contour (in blue) and an iris shape contour in green. The shape is favorable and some of the reflection of the eye (shown in the left image) is removed, as shown in the right image.

In some embodiments, the convex hull may save points where there is a direction change in the contour. At times, this can lead to many points on one side of an image and few points on other sides. This difference in points could lead the fitted ellipse to be unduly influenced by this imbalanced distribution of points, which can lead to a bad ellipse and corresponding fit.

Figure 26:
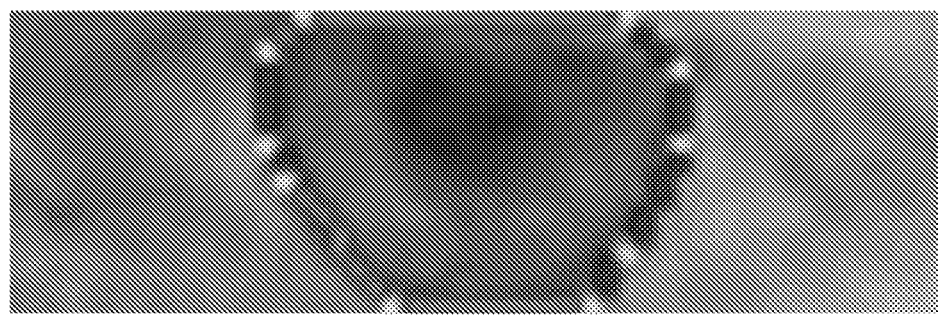
FIG. 26 shows a convex hull contour with original lines, removed lines, and linking lines to improve the form and fit of the ellipse on an iris, according to certain embodiments.

To address this problem, some embodiments may link each convex hull point together, which creates a uniform point weight (no imbalance in point distribution) along the perimeter of the hull. However, in areas with a more sparse distribution of points, connecting lines that are straight and cover relatively long distances may result, which can lead to a poorly fitted ellipse that will likely be found inside the contour. It can be readily seen that both the top and bottom lines (shown in red) should be removed as they will skew the estimate, except the most left/right points of each line, which can be used to help fit the ellipse. In some cases, some straight lines can be added on the removed corner border, which then should be subsequently removed as well. For example, when cropping the image according to the eye landmarks, some artificial gradient may be introduced along the cropped borders (e.g., the non-eye regions may become completely white), and this could result in the many contour points to be found on this cropping edge, rather than the sclera/iris edge. These artificial contour points can thus influence ellipse fitting and should therefore be removed for better ellipse fitting results. In certain embodiments, some candidate lines for removal may include two hull points that are too far away from each other. An example is shown in FIG. 26, where the linked hull contour is shown in blue, removed lines are shown in red, and the green lines are the original hull points.

Morphological Operators

Figure 27:
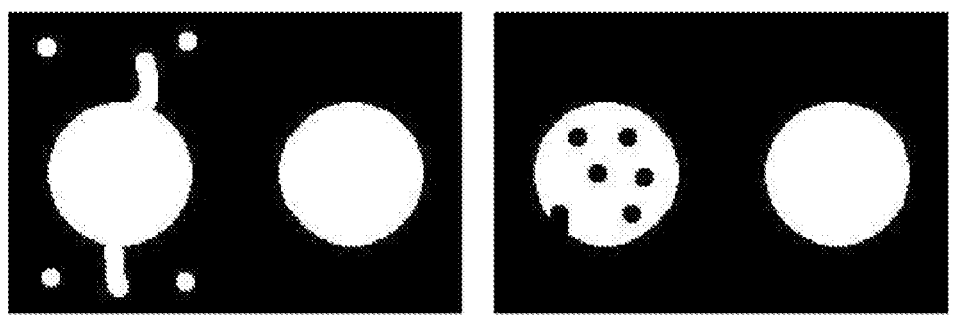
FIG. 27 shows two examples of the application of morphological operators on an image with an Open operator applied on the left image and a Close operator applied on the right image, according to certain embodiments.
Figure 28:
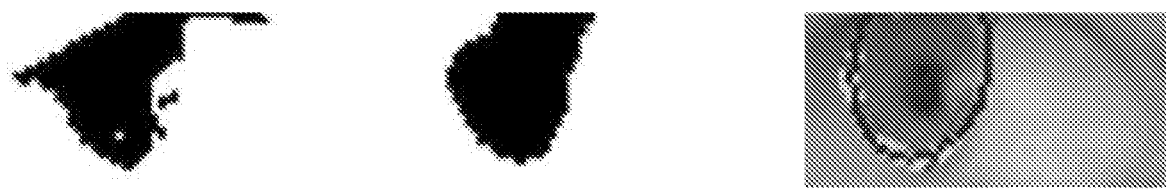
FIG. 28 shows the result of the application of morphological operators presented in the sequence of a threshold image, the morphological image, and the resulting ellipse, according to certain embodiments.
Figure 29:
FIG. 29 shows how a morphological operator can markedly reduce the quality of the iris shape resulting from dynamic thresholding, according to certain embodiments.

In some embodiments, morphological operators are tools that are used to analyze and process geometric structures. For ellipse fitting, open and close morphological operators are used on typically black and white images (e.g., post-dynamic thresholding). As described above, open (opening) operators remove noise outside the shape, while close (closing) operators remove noise inside the shape. FIG. 27 shows two examples of the application of morphological operators on an image with an Open operator applied on the left image and a Close operator applied on the right image, according to certain embodiments. Typically, morphological operators are applied using an elliptical kernel on the threshold image. A kernel can be a convolutional matrix that is swept over the image. This matrix can have different shapes (e.g., defined by the ones and zeros that it contains) and in this case the matrix can be one filled with ones in an "elliptical" fashion, as would be appreciated by one of ordinary skill in the art with the benefit of this disclosure. In some embodiments, the close operator can be applied first, followed by the open operator. This sequence may help reconstruct the shape of the detected iris border to allow for better ellipse fitting one the corresponding convex hull is found. FIG. 28 shows the result of the application of morphological operators presented in the sequence of a threshold image, the morphological image, and the resulting ellipse, according to certain embodiments. Although morphological operators typically result in providing a better iris shape, they can, at times, reduce the quality of the shape found by dynamic thresholding. This is shown, for example, in FIG. 29 where the morphological operator (left image) markedly reduces the quality of the iris shape resulting from dynamic thresholding (right image), according to certain embodiments. To address this, the ellipse can be fitted on the threshold image first (e.g., operation 1940), followed by the application of a morphological operator (e.g., operation 1950) in case of failure (a bad ellipse).

Method Repetitions and Changing the Threshold Divider Value

In certain embodiments, the iris/pupil tracking methodologies described herein rely on repetitions in order to find a suitable threshold value that can lead to a satisfactory shape for a good fitting ellipse. Recall that the threshold divider value is the value that the sum of the minimum and maximum pixel values (e.g., pixel intensity values, grayscale values, etc.) is divided by (e.g., typically starting at 2 for a standard mean) to determine the threshold value that will determine which pixels will be assigned to 0 (black) and 255 (white). With each repetition (iteration), the threshold divider value can be modified based on axis constraints, according to certain embodiments. If the found (generated) ellipse is too small, for instance, it may be interpreted by the system (1000) that too many points (e.g., pixels) have been removed. For instance, if too many pixels are reassigned to white, then the black portions may be too small and the ellipse may also be too small. Each point can be a pixel and by increasing the thresholding value, it can become more difficult for a point to be considered black (e.g., above the thresholding value) and most points may end up being assigned to white (e.g., below the thresholding value). In such cases, the resulting threshold value should be higher to allow more points to be kept (e.g., more points reassigned to black, resulting in a larger image). A higher threshold value can be achieved by decreasing the threshold divider value (e.g., decreasing the denominator results in a higher number). In this example, the threshold divider value can be decreased by 0.1, or other suitable amount, as would be appreciated by one of ordinary skill in the art with the benefit of this disclosure. If the ellipse is determine to be too big, the threshold divider value can be increased (e.g., +0.5), resulting in a smaller ellipse as more points will likely be assigned to white. This distinction of values (e.g., the different values of the thresholding process) may allow the search of a suitable threshold value to be more precise, without requiring too many iterations. To avoid infinite loops or large numbers of iterations, some embodiments of the system may configure the threshold divider value to decrease as many times as necessary in successive iterations, but may not allow increases once a decrease has occurred. Embodiments with the opposite schema (e.g., successive increases are allowed, but no decreases following an increase. In some cases, increases and decreases may be allowed by limited to a certain number of iterations, a certain amount of time to resolve the ellipse, a combination thereof, or the like. One of ordinary skill in the art with the benefit of this disclosure would appreciate the many modifications, variations, and alternative embodiments thereof. In some embodiments, in instances where no in-constraint ellipses can be found and a change in constraints can be seen (e.g., the axes were too small and they went too big in the following iteration), the last ellipse found may be taken into account and used even if it is deemed a bad fit because it may be the best available fit.

Figure 30:
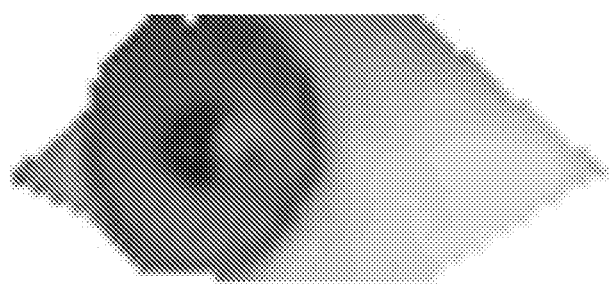
FIG. 30 shows how a previously computed ellipse can be added to a removed corner to expose more of the iris and allow for better fits on subsequent ellipses, according to certain embodiments.

In some embodiments, once the system (operating the eye tracking methodology) has found a result from a previous iteration (e.g., the first pass), a next iteration (e.g., second pass, third pass, etc.) can be run using the first pass results. The previous threshold divider value found can be used as the starting divider value. The previous ellipse can also be used for further refinement. For example, the method can include adding all points of the original image that is inside the ellipse, which can be effective when the found ellipse goes above the corner removed areas. FIG. 30 shows how a previous result (ellipse) is added to a removed corner, which can expose more of the iris and allow for better fits on subsequent ellipses, according to certain embodiments.

Side Looking Adjustments

Figure 31:
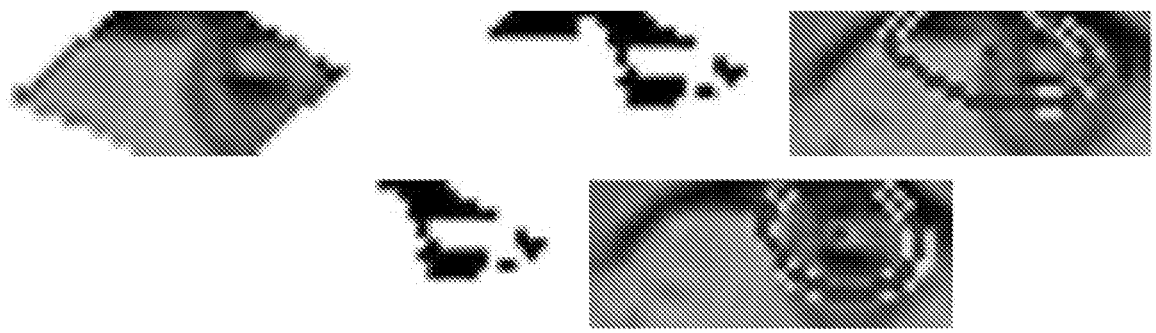
FIG. 31 shows aspects of side eye detection and resolution, according to certain embodiments.

In some scenarios, a person may be looking to the side without moving their head, resulting in a "side eye" configuration with the iris positioned in a corner of the eye with the sclera being viewable on only one side of the iris rather than both sides when the iris is oriented straight ahead. In some implementations, it is possible to use this information to remove part of the image, particularly when the eyelids and eyelashes obscure large portions of the iris. Using a fixed threshold value, the system can detect the white pixels of the eye and count the number of white pixels per column. When there are enough white pixels in this column, it is labeled as white. Determine "enough" pixels in a column can be determine in any suitable manner. For instance, half of the image height can be used to determine "enough" pixels, although other reference values can be used, as would be appreciated by one of ordinary skill in the art with the benefit of this disclosure. Once each white column has been found, neighboring white columns may be connected to form zones. When there is one zone it may be removed. FIG. 31 shows aspects of side eye detection and resolution, according to certain embodiments. The top left image shows an image with a strong eyelid line. The top middle image shows a resulting threshold image. The top right image shows the found ellipse. The bottom images show improved results and with the side looking detection removing part of the eyelid.

RANSAC

Figure 32:
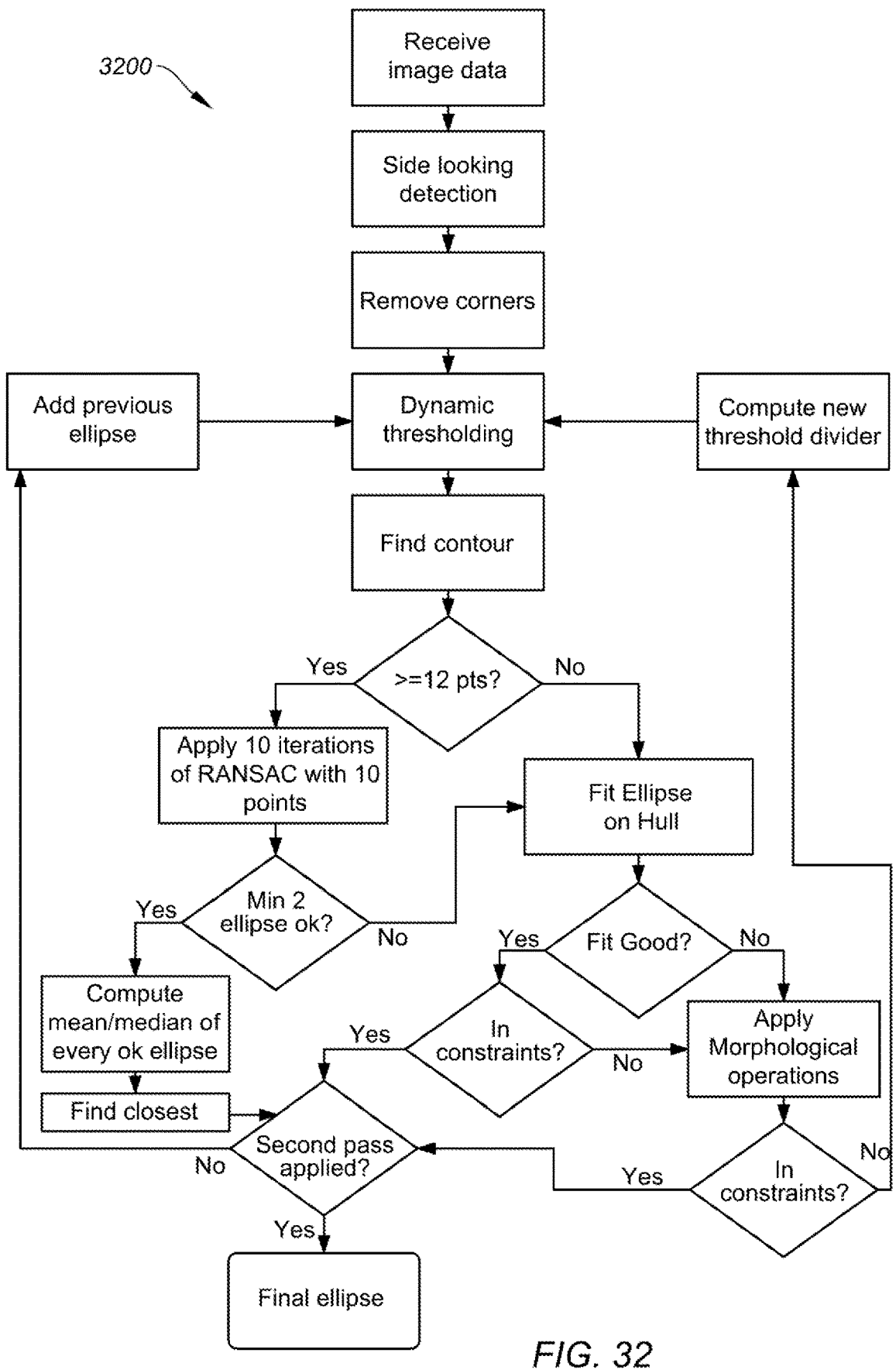
FIG. 32 is a simplified flow chart showing aspects of a method for improved iris/pupil tracking accuracy using a modified RANSAC methodology, according to certain embodiments.

In some embodiments, method 1900 of FIG. 19 can be modified using a "RANSAC" variation (method 3200), as shown in FIG. 32. Method 3200 may incorporate 10 iterations of the RANSAC ellipse fitting (thereby providing 10 ellipses) before applying the convex hull. If the output of the RANSAC fitting is deemed good, meaning that at least two ellipses are within certain constraints (e.g., constraints on axes described above), then the final iris can be the ellipse whose center is the closest to the mean center of all of the good ellipses found with RANSAC, as would be appreciated by one of ordinary skill in the art with the benefit of this disclosure.

Example Embodiment

In some embodiments, a computer-implemented method for tracking a gaze of a user may include: receiving image data (e.g., red channel image data) that includes a plurality of eye landmarks that identify a perimeter of a user's eye; identifying corners of the user's eye based on locations of the eye landmarks; removing the corners of the user's eye from the image data to generate edited image data; applying dynamic thresholding to the edited image data including: determining a lowest pixel intensity value of the edited image data; determining a highest pixel intensity value of the edited image data; selecting a threshold value for the edited image data that is between the lowest and highest pixel intensity values; reassigning pixel values below the threshold value to a minimum intensity value; and reassigning pixel values at or above the threshold value to a maximum intensity value; determining a convex hull based on the dynamically thresholded and edited image data; computing and fitting an ellipse along a boundary of the convex hull, the ellipse corresponding to an iris of the user's eye; updating the edited image data with the computed ellipse; computing a refined ellipse by reapplying the dynamic thresholding and determining the convex hull using the updated edited image data; and determining a gaze direction of the user based in part on a position of the refined ellipse relative to the perimeter of the user's eye.

In some embodiments, the method can further include applying morphological operators to the determined convex hull that remove image noise both inside and outside of the determined convex hull, where the computing (also referred to as "generating" throughout this disclosure) and fitting the ellipse to the convex hull is applied after the morphological operators are applied. In some implementations, the minimum pixel intensity value is 0 corresponding to black, and the maximum pixel intensity value is 255 corresponding to white. In certain aspects, the ellipse and refined ellipse can be fitted along the boundary of the convex hull based on a least-squares approximation. Removing the corners of the user's eye may result in a diamond-shaped image of the user's eye with a left and right side of the image of the user's eye coming to a point due to the removed corners. In some cases, the method can include comparing a width of the ellipse with a width of the perimeter of the eye; comparing a height of the ellipse with a height of the perimeter of the eye; and recomputing the ellipse when the comparison of the widths or the comparison of the heights are outside of a set of predetermined bounded ratios between the size of the ellipse with the size of the user's eye. In some embodiments, selecting the threshold value includes adding the lowest and highest pixel intensity values and dividing by a predetermined value, and recomputing the ellipse includes reapplying dynamic thresholding to the edited image data with a different predetermined value. The method can further include: determining a location of the user's pupil based on the fitted ellipse, where determining the gaze direction of the user is based primarily on the determined location of the user's pupil relative to the perimeter of the user's eye, according to certain embodiments.

Various features described herein, e.g., methods, apparatus, computer readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as a limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A computer-implemented method for tracking a gaze of a user, the method comprising:
   receiving image data that includes a plurality of eye landmarks that identify a perimeter of a user's eye;
   identifying corners of the user's eye based on locations of the eye landmarks;
   removing the corners of the user's eye from the image data to generate edited image data;
   applying dynamic thresholding to the edited image data including:
     determining a lowest pixel intensity value of the edited image data;
     determining a highest pixel intensity value of the edited image data;
     selecting a threshold value for the edited image data that is between the lowest and highest pixel intensity values;
     reassigning pixel values below the threshold value to a minimum intensity value; and
     reassigning pixel values at or above the threshold value to a maximum intensity value;
   determining a convex hull based on the dynamically thresholded and edited image data;
   computing and fitting an ellipse along a boundary of the convex hull, the ellipse corresponding to an iris of the user's eye;
   updating the edited image data with the computed ellipse;

computing a refined ellipse by reapplying the dynamic thresholding and determining the convex hull using the updated edited image data; and determining a gaze direction of the user based in part on a position of the refined ellipse relative to the perimeter of the user's eye.

2. The computer-implemented method of claim 1 further comprising:

applying morphological operators to the determined convex hull that remove image noise both inside and outside of the determined convex hull, wherein the generating and fitting the ellipse to the convex hull is applied after the morphological operators are applied.

3. The computer-implemented method of claim 1 wherein the image data is red channel image data, and the pixel intensity values are grayscale values.

4. The computer-implemented method of claim 1 wherein the minimum pixel intensity value is 0 corresponding to black, and the maximum pixel intensity value is 255 corresponding to white.

5. The computer-implemented method of claim 1 wherein the ellipse and refined ellipse is fitted along the boundary of the convex hull based on a least-squares approximation.

6. The computer-implemented method of claim 1 wherein removing the corners of the user's eye results in a diamond-shaped image of the user's eye with a left and right side of the image of the user's eye coming to a point due to the removed corners.

7. The computer-implemented method of claim 1 further comprising:

comparing a width of the ellipse with a width of the perimeter of the eye;

comparing a height of the ellipse with a height of the perimeter of the eye; and recomputing the ellipse when the comparison of the widths or the comparison of the heights are outside of a set of predetermined bounded ratios between a size of the ellipse with a size of the user's eye.

8. The computer-implemented method of claim 1 wherein selecting the threshold value includes adding the lowest and highest pixel intensity values and dividing by a predetermined value, and wherein recomputing the ellipse includes reapplying dynamic thresholding to the edited image data with a different predetermined value.

9. The computer-implemented method of claim 1 further comprising:

determining a location of the user's pupil based on the fitted ellipse, wherein determining the gaze direction of the user is based primarily on the determined location of the user's pupil relative to the perimeter of the user's eye.

10. A system for tracking a gaze of a user, the system comprising:

one or more processors; and one or more machine-readable non-transitory storage mediums that includes instructions configured to cause one or more processors to perform operations including:

receiving image data that includes a plurality of eye landmarks that identify a perimeter of a user's eye;

applying dynamic thresholding to the image data including:

determining a lowest pixel intensity value of the image data;

determining a highest pixel intensity value of the image data;

selecting a threshold value for the image data that is between the lowest and highest pixel intensity values;

reassigning pixel values below the threshold value to a minimum intensity value; and reassigning pixel values at or above the threshold value to a maximum intensity value;

determining a convex hull based on the dynamically thresholded image data;

computing and fitting an ellipse along a boundary of the convex hull, the ellipse corresponding to an iris of the user's eye;

updating the image data with the computed ellipse;

computing a refined ellipse by reapplying the dynamic thresholding and redetermining the convex hull using the updated image data; and determining a gaze direction of the user based in part on a position of the refined ellipse relative to the perimeter of the user's eye.

11. The system of claim 10 wherein the instructions are further configured to cause the one or more processors to perform operations including:

identifying corners of the user's eye based on locations of the eye landmarks; and removing the corners of the user's eye from the image data.

12. The system of claim 10 wherein the instructions are further configured to cause the one or more processors to perform operations including:

applying morphological operators to the determined convex hull that remove image noise both inside and outside of the determined convex hull, wherein the computing and fitting the ellipse to the convex hull is applied after the morphological operators are applied.

13. The system of claim 10 wherein the image data is red channel image data, and the pixel intensity values are grayscale values.

14. The system of claim 10 wherein the minimum pixel intensity value is 0 corresponding to black, and the maximum pixel intensity value is 255 corresponding to white.

15. The system of claim 10 wherein the ellipse and refined ellipse is fitted along the boundary of the convex hull based on a least-squares approximation.

16. The system of claim 11 wherein removing the corners of the user's eye results in a diamond-shaped image of the user's eye with a left and right side of the image of the user's eye coming to a point due to the removed corners.

17. A non-transitory computer-program product tangibly embodied in a machine-readable non-transitory storage medium that includes instructions configured to cause one or more processors to perform operations including:

receiving image data that includes a plurality of eye landmarks that identify a perimeter of a user's eye;

applying dynamic thresholding to the image data including:

determining a lowest pixel intensity value of the image data;

determining a highest pixel intensity value of the image data;

selecting a threshold value for the image data that is between the lowest and highest pixel intensity values;

reassigning pixel values below the threshold value to a minimum intensity value; and reassigning pixel values at or above the threshold value to a maximum intensity value;

determining a convex hull based on the dynamically thresholded and image data;

computing and fitting an ellipse along a boundary of the convex hull, the ellipse corresponding to an iris of the user's eye;

updating the image data with the computed ellipse;

computing a refined ellipse by reapplying the dynamic thresholding and determining the convex hull using the updated image data; and determining a gaze direction of the user based in part on a position of the refined ellipse relative to the perimeter of the user's eye.

18. The computer-program product of claim 17 wherein the instructions are further configured to cause the one or more processors to perform operations including:

identifying corners of the user's eye based on locations of the eye landmarks; and removing the corners of the user's eye from the image data to generate edited image data.

19. The computer-program product of claim 17 wherein the instructions are further configured to cause the one or more processors to perform operations including:

applying morphological operators to the determined convex hull that remove image noise both inside and outside of the determined convex hull, wherein the computing and fitting the ellipse to the convex hull is applied after the morphological operators are applied.

20. The computer-program product of claim 17 wherein the image data is red channel image data, and the pixel intensity values are grayscale values.

* * * * *